(12) United States Patent
Sousa et al.

(10) Patent No.: US 11,280,482 B2
(45) Date of Patent: Mar. 22, 2022

(54) DIRECTIONALLY MANIPULATABLE VIEW ENHANCEMENT APPARATUS AND SYSTEM

(71) Applicant: WHELEN ENGINEERING COMPANY, INC., Chester, CT (US)

(72) Inventors: David J. Sousa, Ivoryton, CT (US); Kevin M. Smith, Chester, CT (US); Sean Brown, Cromwell, CT (US); Tomasz J. Walczak, Coventry, CT (US)

(73) Assignee: WHELEN ENGINEERING COMPANY, INC., Chester, CT (US)

( * ) Notice: Subject to any disclaimer, the term of this patent is extended or adjusted under 35 U.S.C. 154(b) by 0 days.

(21) Appl. No.: 17/237,226

(22) Filed: Apr. 22, 2021

(65) Prior Publication Data

US 2021/0239303 A1 Aug. 5, 2021

Related U.S. Application Data

(60) Continuation of application No. 16/990,725, filed on Aug. 11, 2020, now Pat. No. 11,168,874, which is a
(Continued)

(51) Int. Cl.
*F21V 21/15* (2006.01)
*B60Q 1/24* (2006.01)
(Continued)

(52) U.S. Cl.
CPC .............. *F21V 21/15* (2013.01); *B60Q 1/245* (2013.01); *F21S 41/657* (2018.01); *F21W 2102/17* (2018.01); *F21Y 2115/10* (2016.08)

(58) Field of Classification Search
CPC .. B60Q 1/24; B60Q 1/245; B60Q 3/40; F21V 21/145; F21V 21/15; F21V 21/30;
(Continued)

(56) References Cited

U.S. PATENT DOCUMENTS

| 3,525,281 A | 8/1970 | Mcgill |
| 5,490,046 A | 2/1996 | Gohl et al. |

(Continued)

FOREIGN PATENT DOCUMENTS

| EP | 2447971 A1 | 5/2012 |
| WO | 0049331 A2 | 8/2000 |
| WO | 2013139338 A1 | 9/2013 |

OTHER PUBLICATIONS

PCT International Search Report and Written Opinion of the International Searching Authority dated Sep. 19, 2019 in corresponding Application No. PCT/US2019/035340, 17 pages.

*Primary Examiner* — Thai Pham
(74) *Attorney, Agent, or Firm* — Hogan Lovells US LLP

(57) ABSTRACT

A directionally manipulatable view enhancement apparatus including a fixed base, a rotatable support supported on the fixed base and rotatable about a pan axis, a yoke disposed on and pivotable with respect to the rotatable support about a tilt axis substantially perpendicular to the pan axis, a pan motor that rotates the rotatable support and yoke about the pan axis, a tilt motor that rotates the yoke about the tilt axis, and a first clutch between the rotatable support and the pan motor permitting the rotatable support to rotate relative to the fixed base independently of the pan motor or a second clutch between the yoke and the tilt motor allowing the yoke to rotate relative to the rotatable support independently of the tilt motor. The yoke retains an electrical component and the pan motor and tilt motor are in electrical communication with a controller remote from the fixed base.

23 Claims, 33 Drawing Sheets

Related U.S. Application Data division of application No. 16/430,867, filed on Jun. 4, 2019, now Pat. No. 10,775,029.

(60) Provisional application No. 62/680,701, filed on Jun. 5, 2018, provisional application No. 62/734,480, filed on Sep. 21, 2018.

(51) Int. Cl.
*F21S 41/657* (2018.01)
*F21Y 115/10* (2016.01)
*F21W 102/17* (2018.01)

(58) Field of Classification Search
CPC ...... F21V 14/02; F21V 23/0492; F21S 8/003; F21S 41/657
See application file for complete search history.

(56) References Cited

U.S. PATENT DOCUMENTS

| | | | |
|---|---|---|---|
| 5,584,560 A * | 12/1996 | Gosswiller | B60Q 1/245 362/233 |
| 5,589,901 A | 12/1996 | Means | |
| 6,124,892 A * | 9/2000 | Nakano | F16M 11/10 348/373 |
| 6,226,174 B1 | 5/2001 | Pratt | |
| D456,012 S | 4/2002 | Pratt | |
| 6,525,281 B2 | 2/2003 | Quapil | |
| D486,128 S | 2/2004 | Pratt | |
| D615,500 S | 5/2010 | Muirhead et al. | |
| D647,062 S | 10/2011 | Deyaf | |
| 8,201,974 B1 * | 6/2012 | Smith | B60Q 1/245 362/257 |
| 8,901,443 B2 | 12/2014 | Baker et al. | |
| 9,048,036 B2 | 6/2015 | Kikuchi et al. | |
| D751,516 S | 3/2016 | Oneufer et al. | |
| D765,611 S | 9/2016 | Kaliauer et al. | |
| D807,309 S | 1/2018 | Johnson et al. | |
| D826,759 S | 8/2018 | Deyaf et al. | |
| 10,086,751 B2 | 10/2018 | Salter et al. | |
| 10,312,037 B1 | 6/2019 | Clark et al. | |
| 2003/0057958 A1 | 3/2003 | Fukushima et al. | |
| 2006/0232985 A1 * | 10/2006 | Wang | F21V 21/092 362/425 |
| 2006/0269278 A1 * | 11/2006 | Kenoyer | F16M 13/02 396/428 |
| 2008/0043098 A1 | 2/2008 | Leblanc | |
| 2012/0120673 A1 * | 5/2012 | Anderson | F21S 41/675 362/514 |
| 2013/0270082 A1 | 10/2013 | Harazawa | |
| 2014/0177258 A1 * | 6/2014 | Gebhard | B60R 11/00 362/547 |
| 2015/0003099 A1 * | 1/2015 | Rasmussen | G01D 5/145 362/523 |
| 2015/0150646 A1 | 6/2015 | Pryor et al. | |

* cited by examiner

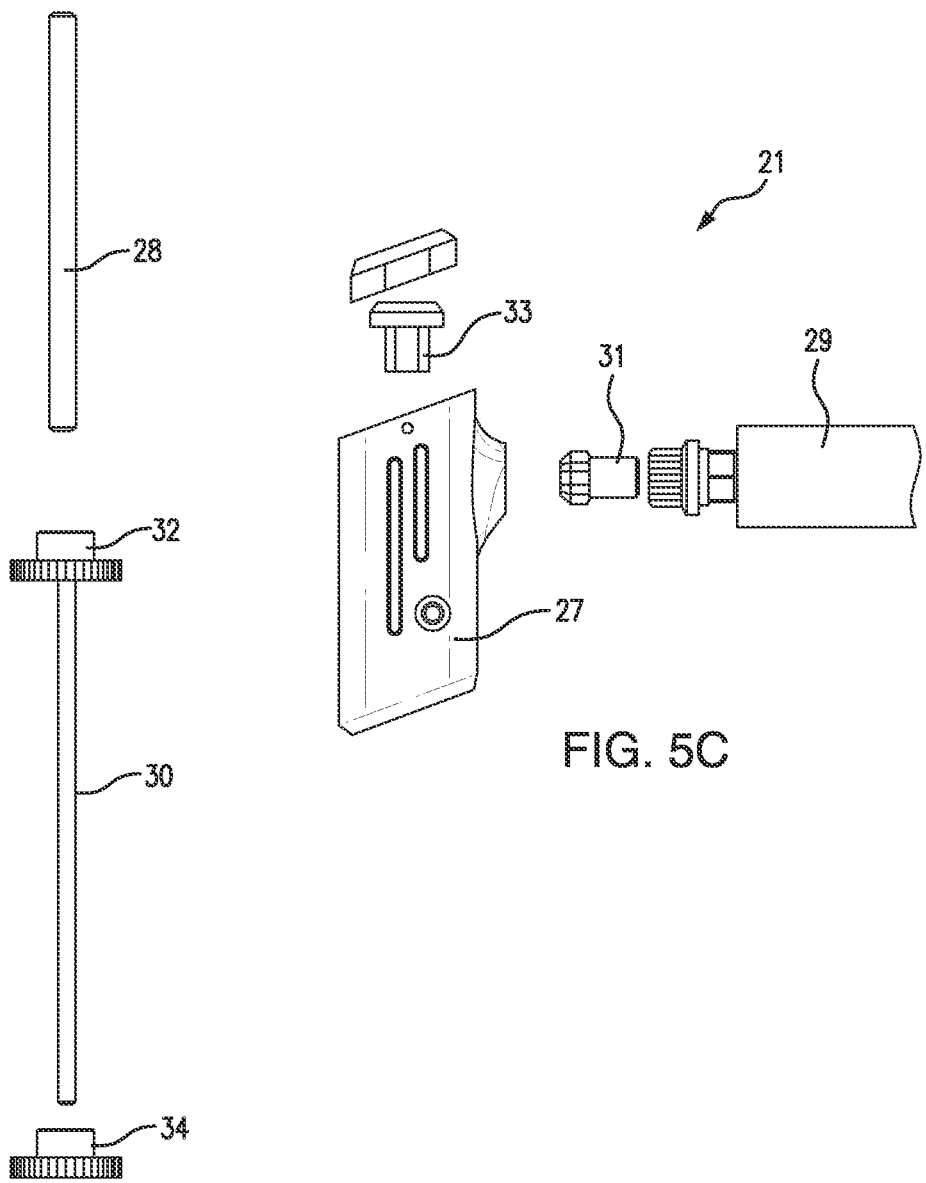

DIRECTIONALLY MANIPULATABLE VIEW ENHANCEMENT APPARATUS AND SYSTEM

FIELD OF THE INVENTION

The invention relates to spotlights for vehicles and other applications, and more specifically to a systems and methods for controlling spotlights and spotlights and controllers employing the same.

BACKGROUND

Many emergency vehicles are equipped with lights that project illumination in a fixed direction, for example, forward of the vehicle, or to the sides of the vehicle. For greatest effectiveness, it is helpful for the first responder to have a source of illumination, such as a spotlight that can be moved to direct light in a desired direction. To be effective, the spotlight must be movable over a wide range of trajectories about a horizontal axis and a vertical axis.

In the past, police and other emergency vehicles have been equipped with spotlights that are directed by means of a mechanism that is installed through a hole in the "A" pillar, a structural member of the vehicle in front of the driver's door and at the left edge of the windshield. Another "A" pillar is located in front of the passenger door at the right edge of the windshield. In older model vehicles, the "A" pillar was a relatively large member formed from mild steel. The required hole was formed using a drill, and the effect on the structural integrity of the "A" pillar was not a large concern.

FIGS. 1-3 represent the functionality of a prior art mechanical control for a spotlight 2. The mechanism to control the spotlight employs an L-shaped handle on the inside of the vehicle. Mechanical force is transmitted from the L-shaped handle mechanism to the spotlight 2 by two concentric shafts 3, 4 that pass through an opening in the "A" pillar. The outer shaft 3 is coupled to the entire handle mechanism, while the inner shaft 4 is coupled to the grip portion 5 only. Application of lateral forces to the grip 5 rotates the entire handle, outer shaft 3 and inner shaft 4, which moves the spotlight 2 over an arc 6 as shown in FIG. 1. The inner shaft 4 is coupled to the grip 5 and to the spotlight 2 by beveled gears so that rotation of the grip 5 about its own axis applies rotational force to the inner shaft 4 and rotates the spotlight 2 about an axis parallel with the grip axis.

When the spotlight 2 is in a vertical orientation, rotation of the grip 5 applies rotational forces to the spotlight 2 to direct the beam laterally (left-right) in a generally horizontal plane about a vertical axis A. This movement may be referred to as "panning" the spotlight. In the prior art mechanical control, an up-down, or "tilt" movement of the spotlight 2 is not possible when the spotlight 2 is in a vertical orientation, which corresponds to the grip 5 being in a vertical orientation (pointing downward inside the vehicle). Moving the grip 5 laterally applies rotational force to the outer shaft, which moves the spotlight 2 along arc 6 from the vertical position to left and right horizontal positions shown in FIG. 1. In either horizontal position of the handle and spotlight 2, rotation of the grip 5 about its own axis rotates the spotlight 2 about a horizontal axis B in an up-down or "tilt" direction. Rotation of the grip 5 when the spotlight 2 and grip 5 are in a vertical orientation results in a left-right (pan) movement of the spotlight 2, while rotation of the grip 5 when the spotlight 2 and grip 5 are in a horizontal orientation results in an up-down "tilt" movement of the spotlight 2.

A combination of lateral and rotational forces applied to the grip 5 allows the user to direct the spotlight 2 in a broad range of directions relative to the vehicle. This control mechanism is a non-intuitive, but serviceable user interface in which the "pan" and "tilt" axes movement of the spotlight are interdependent. This results in a complex mathematical relationship between the direction of the spotlight and movements of the two shafts to produce an intended direction of the spotlight. Personnel operating the mechanical spotlights have learned how to apply rotational movements to the two rotational axes of the control mechanism to obtain the desired spotlight direction, but the movements are not at all intuitive.

The mathematical relationship between the direction of the spotlight and the position of the inner and outer shafts of the control mechanism can be described as follows:

LAMP
$A_Z$ = AZIMUTH ANGLE
$E_L$ = ELEVATION ANGLE
HANDLE
INNER = INNER SHAFT ANGLE
OUTER = OUTER SHAFT ANGLE $$A_Z = \text{INNER} \cdot \text{COS(OUTER)} \qquad 1$$

$$E_L = \text{INNER} \cdot \text{SIN(OUTER)} \qquad 2$$

$$\text{OUTER} = \text{TAN}^{-1}\left(\frac{EL}{A_Z}\right) \qquad 3$$

$$\text{INNER} = \frac{EL}{\text{COS(OUTER)}} \quad \text{if outer} <> 90, 270 \qquad 4$$

or $$\text{INNER} = \frac{A_Z}{\text{SIN(OUTER)}} \quad \text{if outer} <> 0, 180 \qquad 5$$

Equations 1 and 2 define the relationship between the handle and light when the light is driven by the handle from inside the vehicle (normal operation). Equations 3, 4 and 5 define the relationship between the handle and light when the handle is driven by the light (the light is grasped and moved directly from outside the vehicle).

In this control configuration, the up-down "tilt" movement of the light generated by rotation of the inner shaft is dependent upon the rotational position of the outer shaft, as shown in equations 4 and 5 above and FIG. 1. While this prior art control mechanism was effective for many years, changes in vehicle design and increased emphasis on vehicle safety are driving the need for new spotlight control devices and methods.

Vehicles are now being manufactured with structural members formed of tougher materials, such as alloy steels that make drilling a hole very difficult. Further, the A-pillar structural member has become smaller in cross section and manufacturers are wary of allowing third parties to make holes in functional parts of the vehicle safety cage.

There is a need for a spotlight control mechanism that does not require forming a hole in a vehicle structural member. There is also a need for a spotlight control mechanism that resembles the look and feel of the traditional mechanical control mechanism, so police and other first responders will intuitively know how to direct the spotlight.

There is also a need for a spotlight control mechanism that improves over the traditional mechanical control mechanism.

SUMMARY

A spotlight control system according to the disclosure includes a control assembly located inside the emergency vehicle that is convenient to the vehicle operator. A spotlight assembly responsive to the control assembly is mounted to the exterior of the emergency vehicle in a location that minimizes obstruction of the view of the vehicle operator. For example, the spotlight assembly may be mounted to the vehicle at the junction of the fender and hood in front of the "A" pillar or may be mounted to the roof of the vehicle. The spotlight assembly may be mounted to the top or outside surface of the fender to align the spotlight assembly with the "A" pillar from the perspective of the vehicle operator. The control assembly communicates with the spotlight assembly electronically, through a wired or wireless connection.

According to aspects of the disclosure, one embodiment of the control assembly is configured to replicate the look and feel of the L-shaped mechanism that has been used for many years. The handle and grip of a disclosed L-shaped user interface are connected to concentric shafts supported by a control assembly housing. Sensors are arranged in the control assembly to detect rotation of the shafts and generate corresponding spotlight control signals. Programmable microcontrollers in the control assembly and spotlight execute program code to convert movement of the shafts into spotlight control signals directing the spotlight assembly. The relationship between rotation of the shafts and spotlight direction is governed by the program code executed in the control assembly and spotlight assembly microcontrollers. The microcontrollers can be programmed to duplicate the complex mathematical relationship of shaft position to spotlight direction described above or may be simplified to relate the position of each shaft with one spotlight axis of movement.

The relationship between manipulation of the control interface and movement of the spotlight will be referred to in this application as a "transfer function." The disclosed control assemblies and spotlight assemblies include microcontrollers with memory and processors that execute program instructions. The program instructions executed in the control assembly and spotlight assembly can be written to "transfer" movements at the control assembly into movement at the spotlight to produce any desired relationship between movement at the control assembly and the direction of the spotlight assembly. Many police, fire and other first responder personnel are familiar with the widely used "L" shaped mechanical spotlight control mechanism and will presumably be able to quickly learn to use a control mechanism that duplicates the look, feel and function of the mechanical control mechanism. The control assembly may include one or more electric motors connected to the concentric shafts. In an unpowered (off) state, the electric motors may be used to provide drag or mimic the feel of a mechanically controlled spotlight. The electric motors may also be used to bring the user interface back to a "home" position, so the operator always begins with the user interface at the same position. Gears of different diameter may be employed to amplify or reduce the amount of movement at the user interface relative to movement of the internal components detected by sensors. This strategy can be used to modify the ergonomics of the user interface relative to the movement produced at the spotlight assembly. The transfer function may also be used to alter the relationship between movements at the control assembly and movement of the spotlight.

The terms "signal" and "signals" are used interchangeably in this application. It will be understood by those skilled in the art that a "signal" may include multiple distinct components or pieces of information, which could alternatively be generated and transmitted as discrete "signals." For example, a spotlight control signal may include an azimuth angle $A_Z$ and an elevation angle $E_L$ in a combined signal or the azimuth angle $A_Z$ and an elevation angle $E_L$ could be sent separately and characterized as "spotlight control signals." A "signal" as used in this application is not limited to communicating any single piece of information and may include multiple pieces of information. "Signals" do not require more than one piece of information or more than one interaction between sender and receiver, since the relevant information may be conveyed in a single transmission.

A wired or wireless connection between a control assembly and one or more spotlights may be implemented according to any known communication protocol.

Communication protocols using a wired connection include controller area network (CAN), CANopen and DeviceNet. Wireless communication protocols include WiFi and Bluetooth. Modified or proprietary communication protocols may also be employed to establish and maintain communications between devices discussed in this application.

The spotlight control signals are received by the spotlight assembly, and a spotlight microcontroller uses the control signals to energize motors in the spotlight assembly to move the spotlight about a first (tilt) axis and a second (pan) axis perpendicular to the first (tilt) axis, directing a light beam from the spotlight assembly in the intended direction, e.g., a direction corresponding to the movements at the user interface translated according to the programmed transfer function. The spotlight assembly may be mounted to a surface or support that is not horizontal, with the result that the first and second axes of the spotlight assembly movement are not horizontal and vertical, respectively. The programmable transfer function can include a correction factor to account for the mounted position of the spotlight assembly. Sensors in the spotlight assembly detect the position of the spotlight in the up-down (tilt) direction and in the left-right (pan) direction and provide spotlight position signals to the spotlight microcontroller and/or control assembly microcontroller. The spotlight assembly may be configured to return to a "home" position when the spotlight is turned off. The "home" position of the spotlight may correspond to a "home" position for the user interface.

In another embodiment, the control interface is configured to provide a more intuitive relationship between movements of the control interface and the direction of the spotlight. The alternative control interface includes a housing or body that rotates relative to a fixed base, and a handle that pivots relative to the housing. Movement of the housing relative to the base corresponds to the "pan," or left-right movement of the spotlight about a vertical axis, while pivoting of the handle relative to the housing corresponds to the "tilt," or up-down movement of the spotlight about a horizontal axis. This embodiment of a control interface should be easy for an operator to learn how to use, since movement of the control interface components correspond closely to the desired movement of the spotlight. The housing supports a controller PC board and the components necessary to sense movement of the housing and handle and translate those sensed movements into control signals for the spotlight. In one embodiment, a slip ring maintains continuity between conductors in the fixed base and the moveable housing. Movement sensors may be of any known type such as a rheostat or sensors that detect movement of a magnet.

The spotlight assembly includes a directional light source. The directional light source may include one or more beam-forming light generators. The beam may have a fixed beam shape or may have a beam shape that can be varied from a focused "spot" beam to a less focused "flood" pattern. Distant objects are better illuminated with a spot beam shape, while closer objects may be better lit by a wider beam.

According to aspects of the disclosure, movement of the spotlight may be proportional to movement at the control interface. As the user moves the control interface, the spotlight is moved to a position corresponding to the position of the control interface as dictated by the programmed transfer function. The spotlight and user interface remain in their corresponding positions until the user interface or spotlight are moved. Such a control scheme may be described as "proportional servo control." Proportional servo control can be contrasted with systems that move the spotlight along each axis of movement so long as a contact is closed, as in systems employing a joystick-type control interface. The joystick always returns to a neutral position, while the spotlight remains in the last selected position. In other words, there is no specific relationship between the position of the user interface and the direction of the spotlight. Proportional servo control is more like a "fly by wire" control scheme, as used in modern aircraft that employ position sensors and real-time communication between the control interface and device being controlled.

A vehicle may be equipped with more than one spotlight assemblies, with one or both spotlight assemblies being directed by control signals generated by the user interface. The second spotlight assembly has a known position relative to the first spotlight assembly and may be directed by control signals modified according to a transfer function that accounts for the difference in position between the two spotlight assemblies so that the light beams generated by the two spotlight assemblies are directed at the same target (point in space).

The relationship between the control interface and the spotlight assembly may be bi-directional where movement of either the control interface or the spotlight results in a corresponding movement of the other, or one-way, with the spotlight responding to control inputs at the user interface. In a one-way control system, the control assembly may be passive, having no motors. In such an embodiment, the control interface may be constructed to stay in a selected position until moved by the user. Friction can be intentionally generated at the user interface to resist movement when the user is not applying force, so that the user interface and spotlight will remain aligned and in a user-selected position. The spotlight may include clutches to protect the motors and drive train. The clutches are configured to slip when force is applied directly to the spotlight in a manner that could damage the drive mechanism. The spotlight is configured to accurately detect the position of the spotlight components relative to each other even though relative movement is permitted by the clutches.

According to aspects of the disclosure, one embodiment of a spotlight system includes a control assembly and a spotlight assembly. The control assembly includes a base unit rotatable about a control pan axis, a control handle connected to the base unit and rotatable about a control tilt axis substantially perpendicular to the control pan axis, a base unit position sensor to generate a control pan axis position signal based on rotation of the base unit, and a control handle position sensor to generate a control tilt axis position signal based on rotation of the control handle. The control assembly also includes a processor for receiving the control pan axis position signal and the control tilt axis position signal. The spotlight assembly includes a spotlight support rotatable about a spotlight pan axis, a housing including a light, the housing connected to the spotlight support and rotatable with respect to the spotlight support about a spotlight tilt axis substantially perpendicular to the spotlight pan axis, a pan motor for receiving from the processor a voltage signal based on the control pan axis position signal and rotating the spotlight assembly about the spotlight pan axis, and a tilt motor for receiving from the processor a voltage signal based on the control tilt axis position signal and rotating the housing about the spotlight tilt axis.

The spotlight system may include at least one error correction circuit. The at least one error correction circuit receives an actual pan axis position signal representing the position of the spotlight assembly on the pan axis, compares the actual pan axis position signal with the requested pan axis position signal, generates an error signal based on the comparison of the actual pan axis position signal with the requested pan axis position signal, and provides a voltage to a pan axis motor until the error signal is within a predetermined range. The at least one error correction circuit may also receive an actual tilt axis position signal representing the position of the housing on the tilt axis, compare the actual tilt axis position signal with the requested tilt axis position signal, generate an error signal based on the comparison of the actual tilt axis position signal with the requested tilt axis position signal, and provide a voltage to a tilt axis motor until the error signal is within a predetermined range.

In some embodiments, the spotlight system includes a control panel included the control assembly rotatably mounted thereon and at least one control button. In some embodiments, the spotlight system includes a fixed base receiving the spotlight support, a first clutch between the spotlight support and the pan motor, the first clutch permitting the spotlight support to rotate relative to the fixed base independently of the pan motor, and a second clutch between the housing and the tilt motor, the second clutch allowing the housing to rotate relative to the spotlight support independently of the tilt motor. In some embodiments, the pan motor and the tilt motor receive voltage signals wirelessly from the processor. In other embodiments, voltage signals are sent by a wired connection.

According to aspects of the disclosure, one embodiment of a spotlight controller includes a housing having a hub defining a first control axis, a fixed base configured to mate with the housing, the housing rotatable 360° relative to the base about a second control axis perpendicular to the first control axis, a handle configured to engage the hub and pivot about the first control axis, a housing sensor arranged to detect the position of the housing relative to the base and generate a housing position signal, a handle sensor arranged to detect the position of the handle relative to the housing and generate a handle position signal, and a controller PC board mounted to and rotating with the housing, the controller PC board including a microcontroller operatively connected to the housing sensor and the handle sensor. The microcontroller receives the housing position signal and the handle position signal and generates spotlight control signals based on the housing position signal and the handle position signal.

In some embodiments, the microcontroller is programmed to generate spotlight control signals for a plurality of spotlights. In some embodiments, the housing includes a lip and the base includes a plurality of tongues that mate with the lip to retain the housing to the base. In some embodiments, the housing sensor and the handle sensor are mounted to the controller PC board. In some embodiments, the spotlight controller has a slip ring including a fixed part with a first plurality of conductors secured to the base, and a moving part including a second plurality of conductors mounted to the controller PC board, wherein the moving part and the second plurality of conductors rotate with the housing and controller PC board, with the slip ring maintaining electrical continuity between the first plurality of conductors and the second plurality of conductors during movement of the housing relative to the base. The lip may project radially away from a periphery of the housing and the plurality of tongues project radially inwardly over the lip to prevent axial movement of the housing away from the base, while permitting rotation of the housing relative to the base.

In some embodiments, the housing includes a circular lip and the base includes a plurality of tongues and arcuate wall segments that define a circle surrounding the lip, the tongues mate with the lip to retain the housing to the base. In some embodiments, the housing is generally circular, the handle and hub are arranged on a diameter dividing the housing into a front and a rear, the handle and housing being visually similar when viewed from the front or the rear, the controller comprising a visual indicator to distinguish the front of the housing from a rear of the housing. The visual indicator may be a light pipe penetrating the housing to conduct light from an LED within the housing to an exterior of the housing. The spotlight controller may also have a plurality of LEDs of different colors or a single LED capable of generating light of at least two different colors arranged to emit light into the light pipe.

According to aspects of the disclosure, one embodiment of a spotlight includes a base defining a first spotlight axis, a support mounted to the base for rotation about the first spotlight axis, a support motor mounted to the support and configured to rotate the support about the first spotlight axis, a yoke mounted to the support for rotation about a second spotlight axis perpendicular to the first spotlight axis, a yoke motor mounted to the support and configured to rotate the yoke about the second spotlight axis, a support sensor arranged to detect a position of the support and generate a support position signal, a yoke sensor arranged to detect a position of the yoke and generate a yoke position signal, and a microcontroller operatively connected to the support sensor, the support motor, the yoke sensor and the yoke motor, the microcontroller responsive to a spotlight control signal including an azimuth angle AZ and an elevation angle EL, the microcontroller programmed to apply power to the support motor until the support position signal corresponds to the azimuth angle AZ and to apply power to the yoke motor until the yoke position signal corresponds to the elevation angle EL.

In some embodiments, the spotlight has a support clutch between the support and the support motor, the support clutch permitting the support to rotate relative to the base independently of the support motor, and a yoke clutch between the yoke and the yoke motor, the yoke clutch allowing the yoke to rotate relative to the support independently of the yoke motor. In some embodiments, the support sensor detects movement of the support relative to the base when the support is moving independently of the support motor and the yoke sensor detects movement of the yoke relative to the support when the yoke is moving independently of the yoke motor. In some embodiments, the support motor is coupled to the support by a clutch, the support sensor is directly coupled to the support, the yoke motor is coupled to the yoke by a clutch and the yoke sensor is directly coupled to the yoke.

According to aspects of the disclosure, one embodiment of a spotlight control method includes steps of providing a control assembly having base unit and a control handle connected to the base unit, the base unit rotatable about a first axis and the control handle rotatable about a second axis substantially perpendicular to the first axis, providing a spotlight assembly having a spotlight rotatable about a pan axis and a tilt axis substantially perpendicular to the pan axis, and generating at least one of a requested pan axis position signal by rotating the base unit about the first axis to rotate the spotlight about a pan axis or a requested tilt axis position signal by rotating the control handle about the second axis to rotate the spotlight about a tilt axis.

In some embodiments, the rotation of the base unit about the first axis proportionally rotates the spotlight about a pan axis and rotation of the control handle about the second axis proportionally rotates the spotlight about a tilt axis. In some embodiments, the method further includes receiving an actual pan axis position signal representing the position of the spotlight on the pan axis, comparing the actual pan axis position signal with the requested pan axis position signal, generating an error signal based on the comparison of the actual pan axis position signal with the requested pan axis position signal, and providing a voltage to a pan axis motor until the error signal is within a predetermined range. In some embodiments, the method further includes receiving an actual tilt axis position signal representing the position of the spotlight on the tilt axis, comparing the actual tilt axis position signal with the requested tilt axis position signal, generating an error signal based on the comparison of the actual tilt axis position signal with the requested tilt axis position signal, and providing a voltage to a tilt axis motor until the error signal is within a predetermined range.

According to aspects of the disclosure, another embodiment of a control assembly for a spotlight includes a frame, a first shaft connected to the frame and arranged to rotate relative to the frame, a second shaft connected to the frame and arranged to rotate relative to the frame independently of the first shaft, the second shaft surrounded by the first shaft, a first sensor supported by the frame and situated to detect a rotational position of the first shaft and generate a first position signal, a second sensor supported by the frame and situated to detect a rotational position of the second shaft and generate a second position signal, and a microcontroller operatively connected to the first and second sensors to receive the first and second position signals, the microcontroller configured to employ the first and second position signals to produce a spotlight directional control signal, wherein rotation of the first shaft relative to the frame also rotates the second shaft, and rotation of the second shaft relative to the frame does not rotate the first shaft. In some embodiments, the first and second shafts are coaxial to a shaft axis, the first shaft having an outer end connected to a handle assembly for rotation therewith, the handle assembly including a grip rotatable about a grip axis perpendicular to the shaft axis, the second shaft having an outer end coupled to the grip so that rotation of the grip about the grip axis rotates the second shaft about the shaft axis. In some embodiments, the microcontroller is programmed to generate spotlight directional control signals corresponding to an azimuth angle $A_z$ calculated according to the formula: inner shaft angle x cos (outer shaft angle) and an elevation angle $E_L$, calculated according to the formula: inner shaft angle x sin (outer shaft angle). In some embodiments, the frame includes a base and brackets arranged to support the first and second shafts in a coaxial relationship relative to a shaft axis, an inner end of the first shaft coupled to a first gear and an inner end of the second shaft coupled to a second gear coaxial with the first gear, the first gear between the second gear and an outer end of the first shaft. In some embodiments, the first gear drives a first magnet ring carrying a first magnet, the first sensor arranged to detect the position of the first magnet, the second gear drives a second magnet ring carrying a second magnet, the second sensor arranged to detect the position of the second magnet. In some embodiments, the control assembly includes a first motor supported by the frame and arranged to rotate the first shaft, and a second motor supported by the frame and arranged to rotate the second shaft, the first and second motors operatively connected to the microcontroller and responsive to the application of power by the microcontroller to drive the first and second shafts.

The control assembly may be incorporated in a spotlight system, wherein the control assembly includes a motor supported by the frame and arranged to rotate the first shaft or the second shaft, the spotlight system including a spotlight having a light source mounted to a yoke pivotable by a yoke motor about a first spotlight axis, the yoke mounted to a support rotatable by a support motor about a second spotlight axis, a yoke sensor arranged to detect a position of the yoke and generate a yoke position signal, a support sensor arranged to detect a position of the support and generate a support position signal, and a microcontroller operatively connected to the yoke sensor, yoke motor, support sensor and support motor, the microcontroller programmed to receive the yoke position signal and the support position signal and to direct the light source according to the spotlight directional control signals by applying power to the yoke motor to rotate the yoke about the first spotlight axis and applying power to the support motor to rotate the support about the second spotlight axis, the microcontroller generating a spotlight position signal corresponding to the yoke position signal and the support position signal, the spotlight position signal communicated to the control assembly through a wired or wireless connection.

Other objects of the invention and its particular features and advantages will become more apparent from consideration of the following drawings and accompanying detailed description.

BRIEF DESCRIPTION OF THE DRAWINGS

FIGS. 5A-5C are illustrations of an embodiment of a disclosed user interface;

DETAILED DESCRIPTION

Exemplary spotlight control systems and spotlight assemblies illustrating various aspects of the present disclosure will now be described with reference to FIGS. 4 through 32, wherein like numbers refer to like parts. Throughout the figures, some features and components of the assembly are omitted for clarity.

Figure 1:
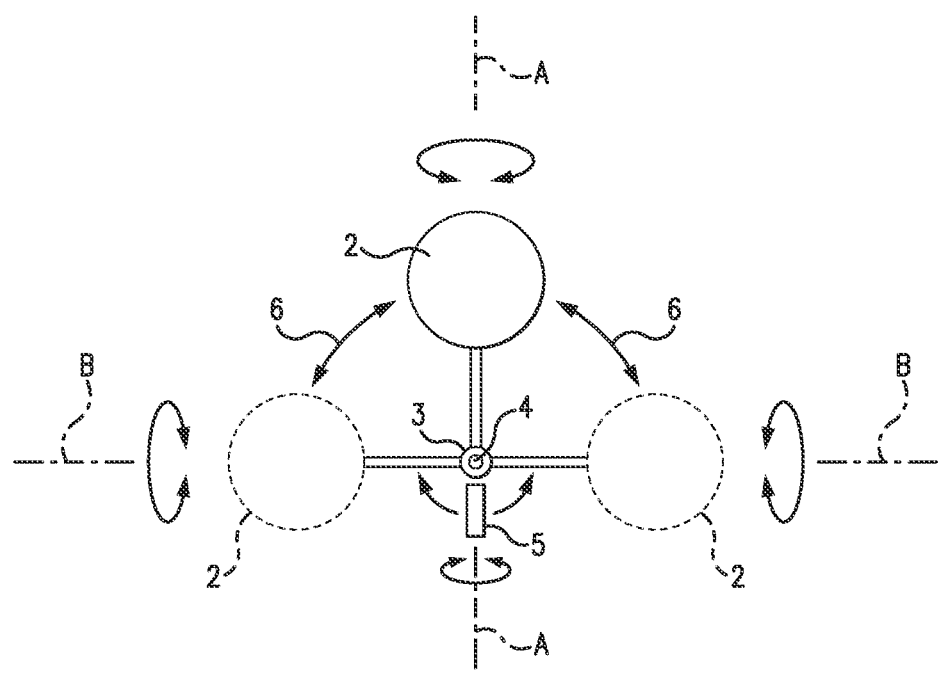
FIGS. 1-3 are illustrations of the functionality of prior art mechanical spotlight assemblies.
Figure 2:
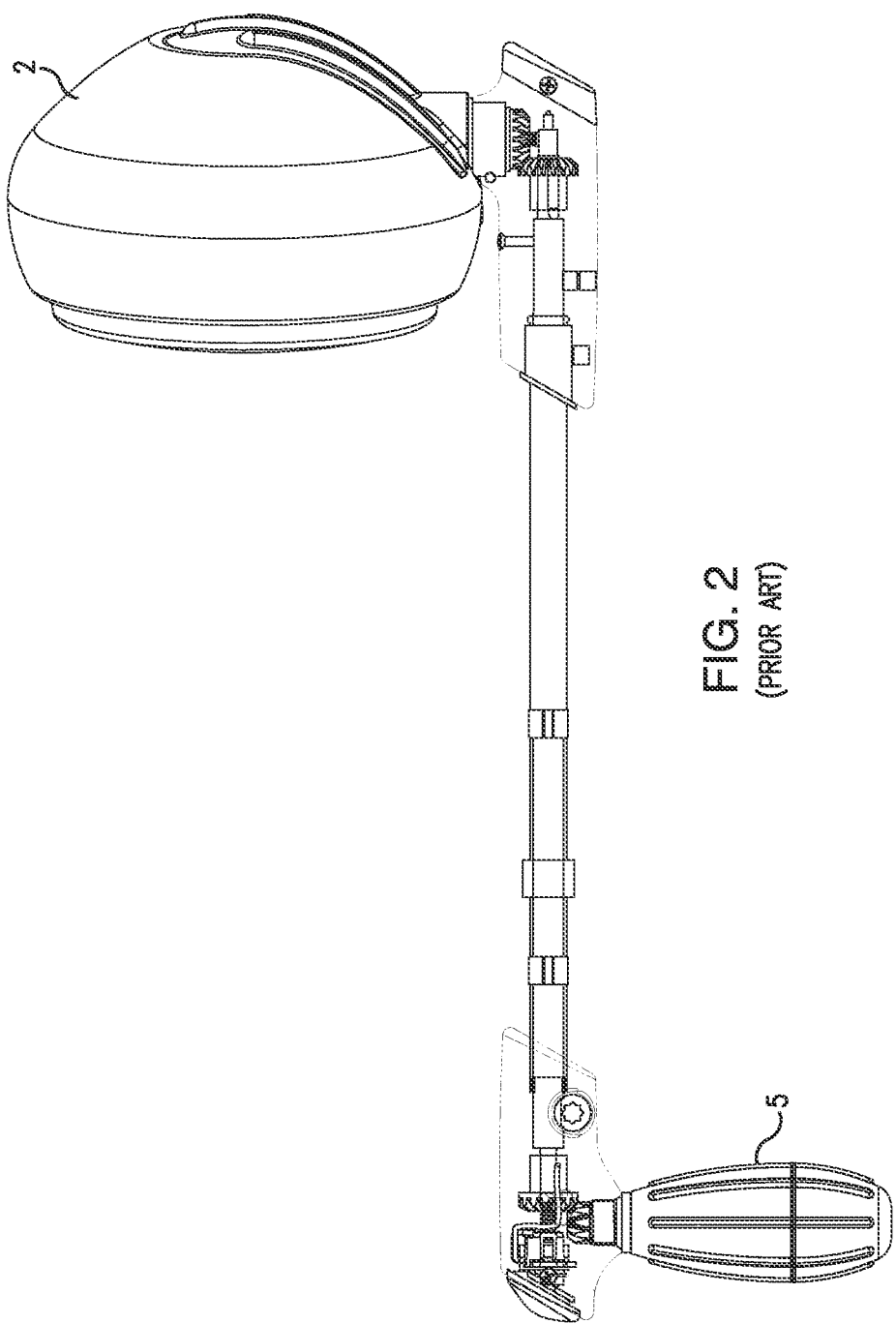
Figure 3:
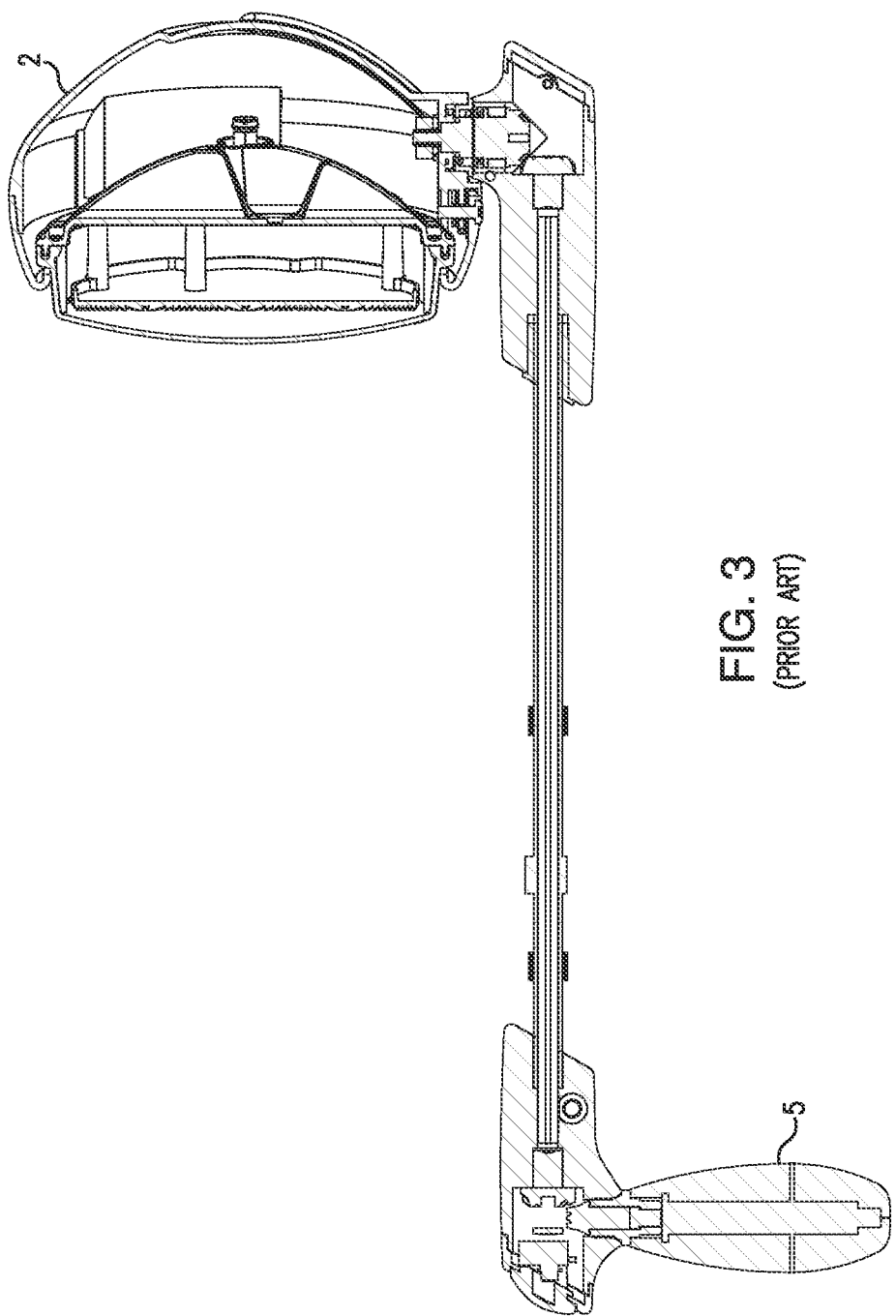
Figure 4:
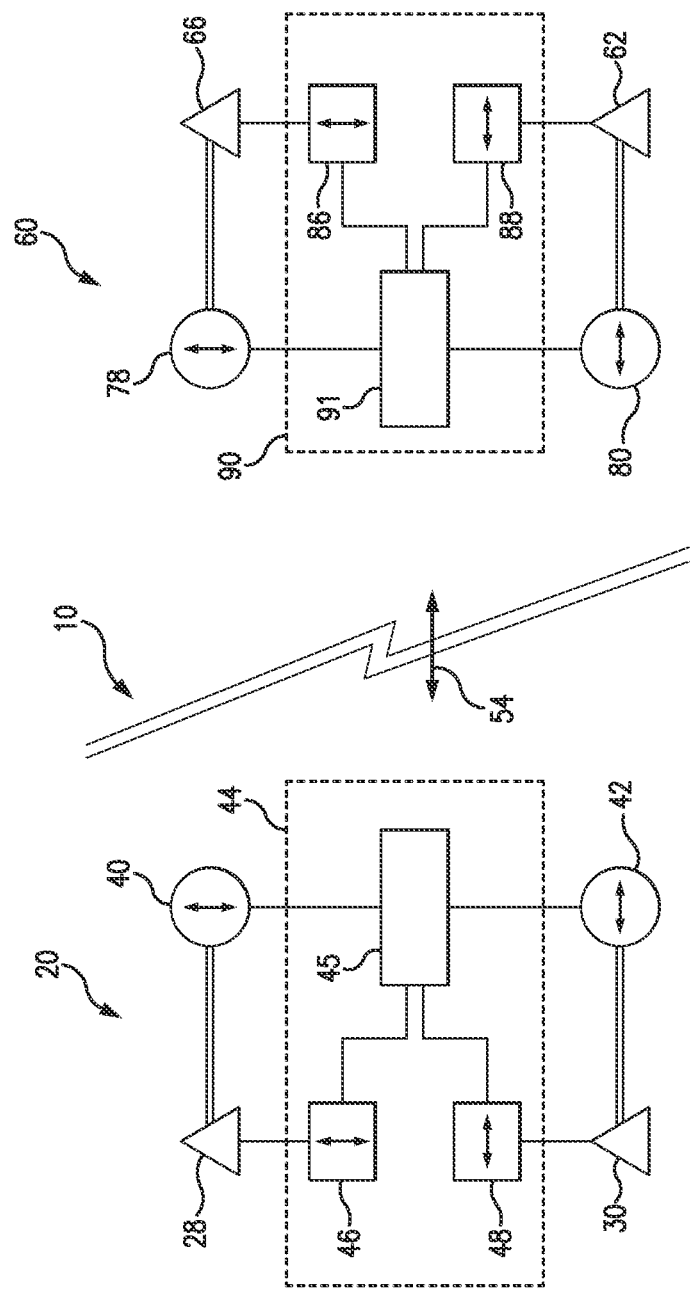
FIG. 4 is a representative schematic block diagram of one embodiment of a disclosed spotlight control system and spotlight assembly.

FIG. 4 is a block diagram of a spotlight control system 10, showing the basic relationships between functional units of a control assembly 20 and a spotlight assembly 60. Each of the control assembly 20 and spotlight assembly 60 include a PC board 44, 90 with a programmable microcontroller 45, 91 that execute program code stored in memory. The microcontrollers 45, 91 are operatively connected internally to components of the respective control assembly 20 and spotlight assembly 60 and externally to each other via a wired or wireless connection 54. A wired or wireless connection 54 between the control assembly 20 and the spotlight assembly 60 may be a direct connection, or may pass through one or more additional electronic assemblies, such as an emergency vehicle control module (not shown). Any known communication standard may be used to permit the exchange of information between the control assembly 20 and spotlight assembly 60.

Figure 5A:
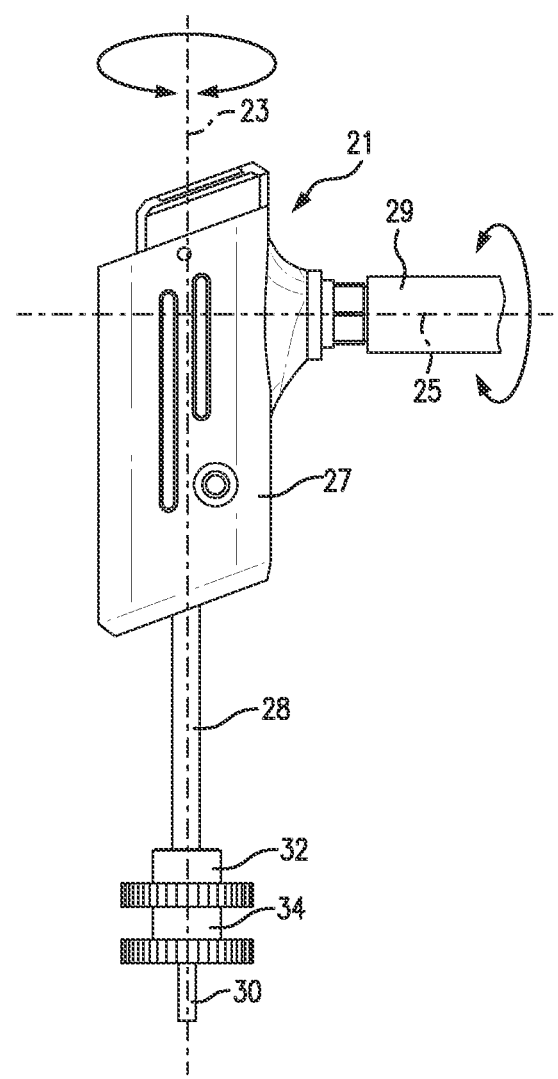

FIGS. 5A to 5C illustrate a first exemplary user interface 21 configured to emulate the look and feel of the manual control mechanism employed by prior art, mechanically-directed spotlights. The user interface 21 includes a handle 27 rotatable about a first axis 23, and a grip 29 extending from the handle 27 and rotatable about a second axis 25. In the depicted embodiment, the first axis 23 is perpendicular to the second axis 25 to reproduce the configuration of the prior art manual control mechanism. The handle 27 is fixed to an outer shaft 28, which rotates with the handle 27 about the first axis 23. As shown in FIGS. 5B to 5C, the grip 29 is attached to a beveled gear 31, which engages a beveled gear 33 fixed to an inner shaft 30. The beveled gears 31, 33 translate rotation of the grip 29 about the second axis 25 into rotation of the inner shaft 30 about the first axis 23. The outer shaft 28 surrounds the inner shaft 30, and the coaxially arranged outer and inner shafts 28, 30 penetrate a user interface housing (not shown), where the outer shaft 28 is connected to gear 32 and inner shaft 30 is connected to gear 34. Rotation of the handle 27 about first axis 23 rotates gear 32 and rotation of the grip about second axis 25 rotates gear 34 inside the control assembly 20. In a typical installation, the first axis 23 is horizontal and the second axis 25 is vertical, which duplicates the orientation of the prior art mechanical user interface.

Figure 6:
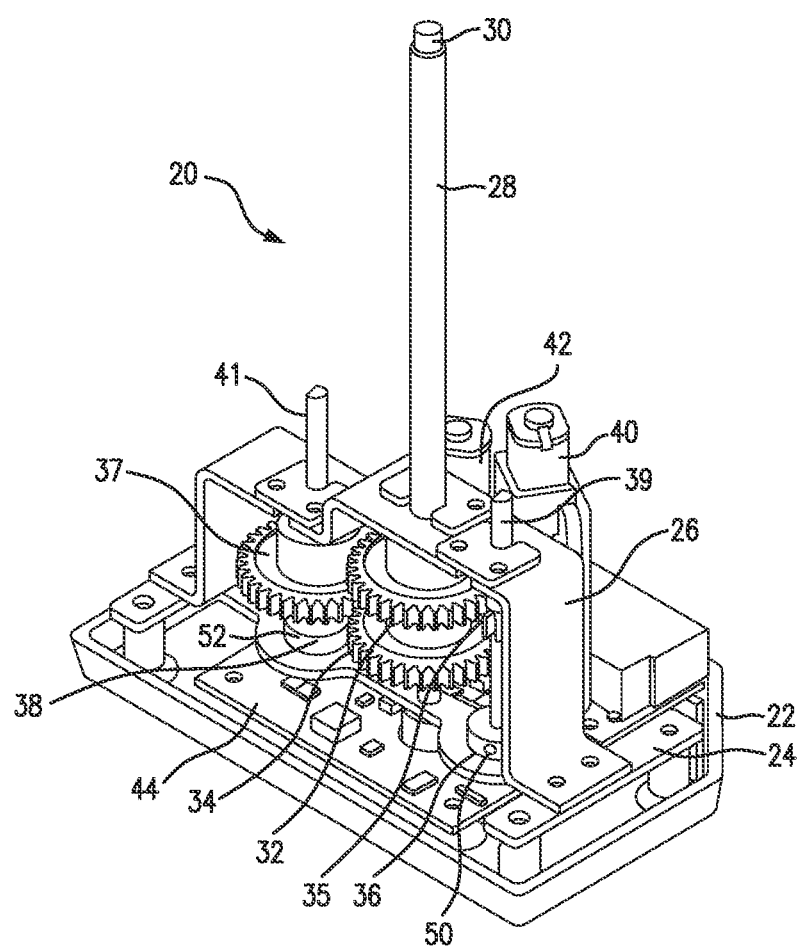
FIG. 6 is a perspective view of one embodiment of a disclosed control assembly compatible with the user interface of FIGS. 5A-5C.

FIG. 6 illustrates an exemplary control assembly 20 with an exterior housing, handle 27, and grip 29 omitted for clarity. A base 22 provides support for the internal components of the control assembly 20. A control assembly PC board 44 is mounted to the base 22. Brackets 24, 26 provide structural support for the shafts 28, 30, gears 32, 34, magnet rings 36, 38, and motors 42, 40. The base 22, brackets 24, 26 and other hardware can be referred to collectively as a frame configured to support the components of the control assembly 20. Gear 32 meshes with adjacent gear 35, which is mounted on a shaft 39 along with a magnet ring 36 carrying magnet 50. It will be noted that gear 35 has a smaller diameter and fewer teeth than gear 32, resulting in an overdrive, which translates a given rotation of the outer shaft 30 into a greater rotation of gear 35, shaft 39 and magnet ring 36. The selection of gears 32, 35 allows 360° rotation of the magnet ring 36 by less than 360° rotation of the handle 27 and outer shaft 28 about axis 23. Gear 34 meshes with adjacent gear 37, which is mounted on a shaft 41 along with a magnet ring 38 carrying magnet 52. Gears 34 and 37 are the same diameter and have the same number of teeth, providing a 1:1 relationship between rotation of the inner shaft 30 and rotation of the magnet ring 38. The control assembly PC board 44 is configured with a handle position sensor 46 (beneath magnet ring 36) and a grip position sensor 48 (beneath magnet ring 38) that sense the rotational position of magnets 50, 52 in the magnet rings 36, 38. In the embodiment of a control assembly 20 shown in FIGS. 5A to 6, the position of the magnets 50, 52 sensed by the handle position sensor 46 and the grip position sensor 48, respectively correspond to the position of the handle 27 and grip 29.

Referring to FIG. 6, the control mechanism 20 includes a handle motor 40 arranged to move the outer shaft 28 and handle 27, and a grip motor 42 arranged to move the inner shaft 30 and grip 29. The handle motor 40 provides resistance to movement of the outer shaft 28 when the handle motor 40 is in an off state and can move the outer shaft 28 and the first magnet ring 36 when power is applied to the handle motor 40 by the microcontroller 45. The grip motor 42 provides resistance to movement of the inner shaft 30 when it is in an off state and can move the inner shaft 28 and the second magnet ring 38 when power is applied to the grip motor 42 by the microcontroller 45. The resistance to movement of the handle 27 and grip 29 provided by the handle motor 40 and the grip motor 42 may simulate the resistance to movement produced by friction and weight of the spotlight in the prior art mechanical control assembly.

In the depicted embodiment, the handle sensor 46 and grip sensor 48 detect the position of first and second magnets 50, 52 that rotate with the first magnet ring 36 and the second magnet ring 38, respectively. The handle sensor 46 and grip sensor 48 and handle motor 40 and grip motor 42 are operatively connected to the microcontroller 45 (depicted in FIG. 4) on the control assembly PC board 44. The microcontroller 45 interprets handle and grip position data from the handle sensor 46 and grip sensor 48, respectively, and generates spotlight control signals that are delivered to the spotlight assembly 60 through the wired or wireless connection 54. The microcontroller 45 may store the position data and spotlight control signals in memory for later reference. The disclosed control assembly 20 allows the microcontroller 45 to operate the handle motor 40 and grip motor 42 to move the outer shaft 28 and inner shaft 30 as needed to return the control interface 21 to a "home" or starting position, or to align the position of the control interface 21 (handle 27 and grip 29) with the position of the spotlight assembly 60 as will be discussed below.

Figure 7:
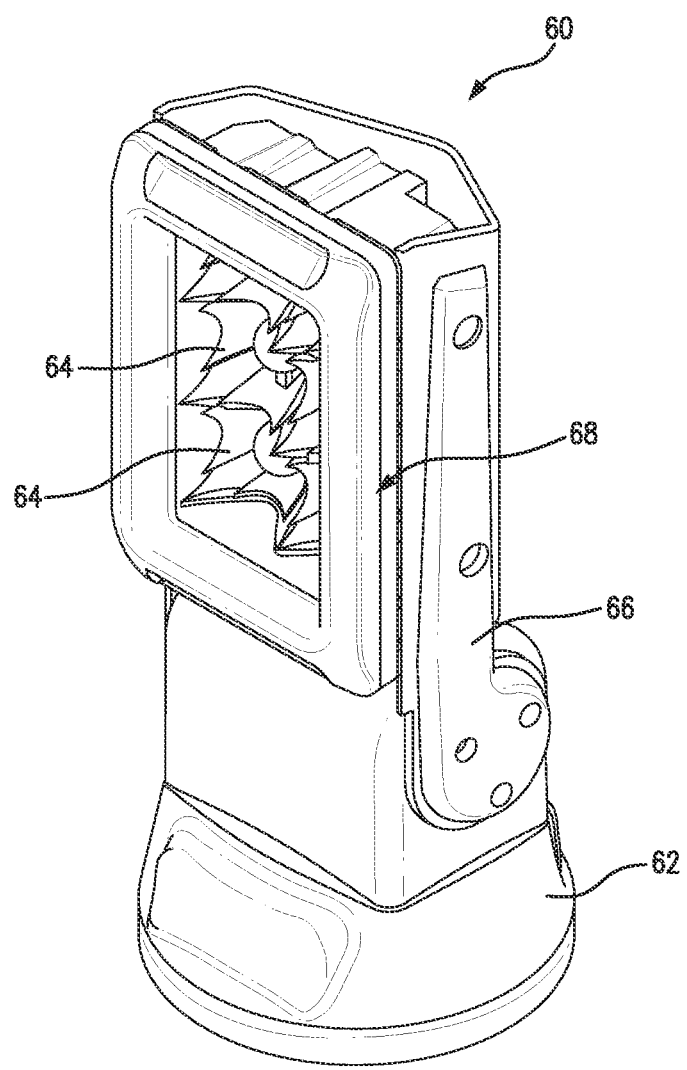
FIG. 7 is a perspective view of an embodiment of a spotlight assembly.
Figure 8:
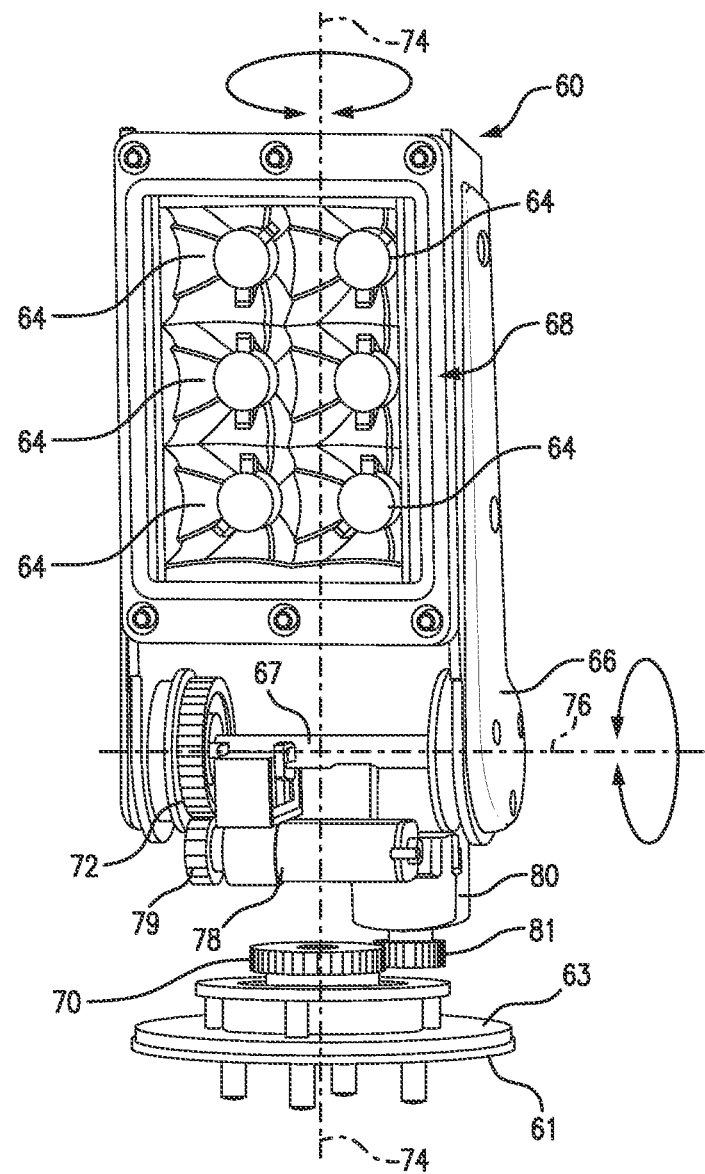
FIG. 8 is an isometric view of the spotlight assembly of FIG. 7 with a portion of the housing removed for clarity.

FIGS. 7 and 8 illustrates an exemplary embodiment of a spotlight assembly 60 of the spotlight control system 10. The spotlight assembly 60 includes a light source 68 mounted to a pivotable yoke 66, which is mounted to a rotatable support 62. In the depicted embodiment, the light source 68 comprises a group of light generators 64 (e.g., LED light assemblies) that together generate a beam of light that can be aimed by rotating the support 62 and pivoting the yoke 66. The yoke 66 and light source 68 rotate (pivot) together around a spotlight tilt axis 76 and the support 62 rotates about a spotlight pan axis 74. As shown in FIG. 8, the disclosed spotlight assembly 60 includes a base 61 that is fixed to a vehicle surface or bracket (not shown) and a turntable 63 arranged to rotate about axis 74 relative to the base 61. The support 62 is omitted from FIG. 8 for clarity. The support 62 is mounted to the turntable 63 and projects upwardly to provide the apertures or mounting points for receiving the yoke 66. A center gear 70 is fixedly connected to the base 61 and does not rotate relative to the base 61. The center gear 70 is surrounded by the turntable 63, and the turntable 63 is free to rotate relative to the center gear 70 and the base 61. A pan motor 80 includes a drive gear 81 engaged with the teeth of the center gear 70. Application of power to the pan motor 80 causes the turntable 63, support 62, yoke 66 and light source 68 to rotate about the pan axis 74. The pan motor 80 is a reversible motor that can drive the spotlight assembly 60 in a clockwise or counterclockwise direction.

As shown in FIG. 8, the yoke 66 is supported on a shaft 67 that includes a gear 72. A tilt motor 78 includes a drive gear 79 engaged with the teeth of the gear 72. Application of power to the tilt motor 78 pivots the yoke 66 and light source 68 about the tilt axis 76. The tilt motor 78 is a reversible motor that can pivot the yoke and light source 68 either direction about the tilt axis 76.

When discussing embodiments of the disclosed spotlight assemblies, the term "pan" is used to refer to rotation of the spotlight in a left-right direction about a vertical axis (such as spotlight pan axis 74), while the term "tilt" is used to refer to movement of the spotlight in an up-down direction about a horizontal axis (such as spotlight tilt axis 76). When the spotlight assembly is not mounted to a horizontal surface, the axes of rotation of the spotlight will not be vertical and horizontal. A programmable transfer function in the control assembly microcontroller 45 and/or the spotlight microcontroller 91 may be used to correct for the difference between the actual orientation of the spotlight axes of rotation and the vertical and horizontal directions.

Referring to FIG. 4, the spotlight PC board 90 includes the spotlight microcontroller 91, support sensor 88, and yoke sensor 86. The support sensor 88, yoke sensor 86, pan motor 80, and tilt motor 78 are operatively connected to the spotlight microcontroller 91. Movement of the turntable 63 and support 62 around the spotlight pan axis 74 and pivoting of the yoke 66 and light source 68 around the spotlight tilt axis 76 are detected by support sensor 88 and yoke sensor 86, respectively. The support sensor 88 and yoke sensor 86 may be magnetic sensors that detect the position of magnets carried by magnet rings arranged to move with the support 62 and yoke 66, respectively, and may function as described with respect to the control assembly handle sensor 46 and grip sensor 48. The spotlight microcontroller 91 interprets this movement data and generates spotlight position signals corresponding to the rotational (pan) and pivot (tilt) position of the spotlight assembly 60. The spotlight microcontroller 91 may store the movement data and spotlight position signals in memory. The spotlight microcontroller 91 activates pan motor 80 and tilt motor 78 to move the support 62 and/or yoke 66 in response to spotlight control signals from the control assembly 20. The support 62 and yoke 66 are mechanically linked to the pan motor 80 and tilt motor 78, respectively, which results in resistance to movement if the spotlight itself is grasped and moved by a user.

The control assembly microcontroller 45 communicates with the spotlight microcontroller 91 through a wired or wireless connection 54. The microcontroller 45 sends spotlight control signals to the spotlight microcontroller 91 to activate the pan motor 80 and tilt motor 78 to move the light source 68 to point in a desired direction in response to user manipulation of the control interface handle 27 and grip 29. The spotlight microcontroller 91 may also send spotlight position signals to the control assembly microcontroller 45 to activate the handle motor 40 and grip motor 42. The microcontrollers 45, 91 can be programmed to coordinate the positions of the control interface 21 with the position of the support 62 and yoke 66. For example, if a user grasps and moves the spotlight directly, the position of the spotlight can be reported to the control assembly microcontroller 45, which can be programmed to activate the handle motor 40 and grip motor 42 to move the handle 27 and grip 29 to positions corresponding to the position of the spotlight. This is an example of bi-directional control between the control assembly 20 and spotlight assembly 60.

A computer program executed by the control assembly microcontroller 45 translates movement of the outer shaft 28 and inner shaft 30 into spotlight control signals which are sent to the spotlight assembly 60 via the wired or wireless connection 54. The executable program code running in the control assembly microcontroller 45 and/or spotlight microcontroller 91 can include a transfer function to convert movement of the outer shaft 28 and inner shaft 30 to spotlight movement that duplicates the complex relationship between the mechanical user interface and the direction of the spotlight of the prior art mechanical spotlight, which is described above. Alternatively, the transfer function may translate rotation of one shaft to spotlight movement about one axis and rotation of the other shaft may be translated to spotlight movement about the other axis. For example, the movement of the outer shaft can be programmed to control left-right movement of the spotlight about a "pan" axis 74 and movement of the inner shaft 30 can be programmed to control up-down movement of the spotlight about a "tilt" axis 76. A programmable transfer function according to aspects of the disclosure permits the relationship of movements at the user interface 21 to movement of the spotlight 60 to be changed without alteration of any mechanical parts of the control assembly 20 or the spotlight assembly 60.

The control assembly 20 and spotlight assembly 60 may be configured to retain a pre-determined position of the control interface 21 to the direction of the spotlight when the spotlight control system 10 is in an "on" state. In one embodiment, the control assembly microcontroller 45 stores the position of the handle 27 and grip 29 in memory, and the spotlight microcontroller 91 stores the rotational and tilt position of the light source 68 in memory. When the spotlight control system 10 is in an "off" state, the user interface 21 and spotlight assembly 60 are independently moveable against the resistance of the motors. When the spotlight control system 10 is powered "on" from this state, the handle sensor 46 and grip sensor 48 measure the current positions of the handle 27 and grip 29, and the support sensor 88 and yoke sensor 86 measure the current positions of the support 62 and yoke 66, respectively. The control assembly microcontroller 45 and spotlight microcontroller 91 may return the handle 27, grip 29, support 62, and yoke 66 to their stored positions using the handle motor 40, grip motor 42, pan motor 80, and tilt motor 78. In some embodiments it may be most efficient to move either the handle 27 and grip 29 or the support 62 and yoke 66, whichever set moved from the stored position the least.

Figure 9:
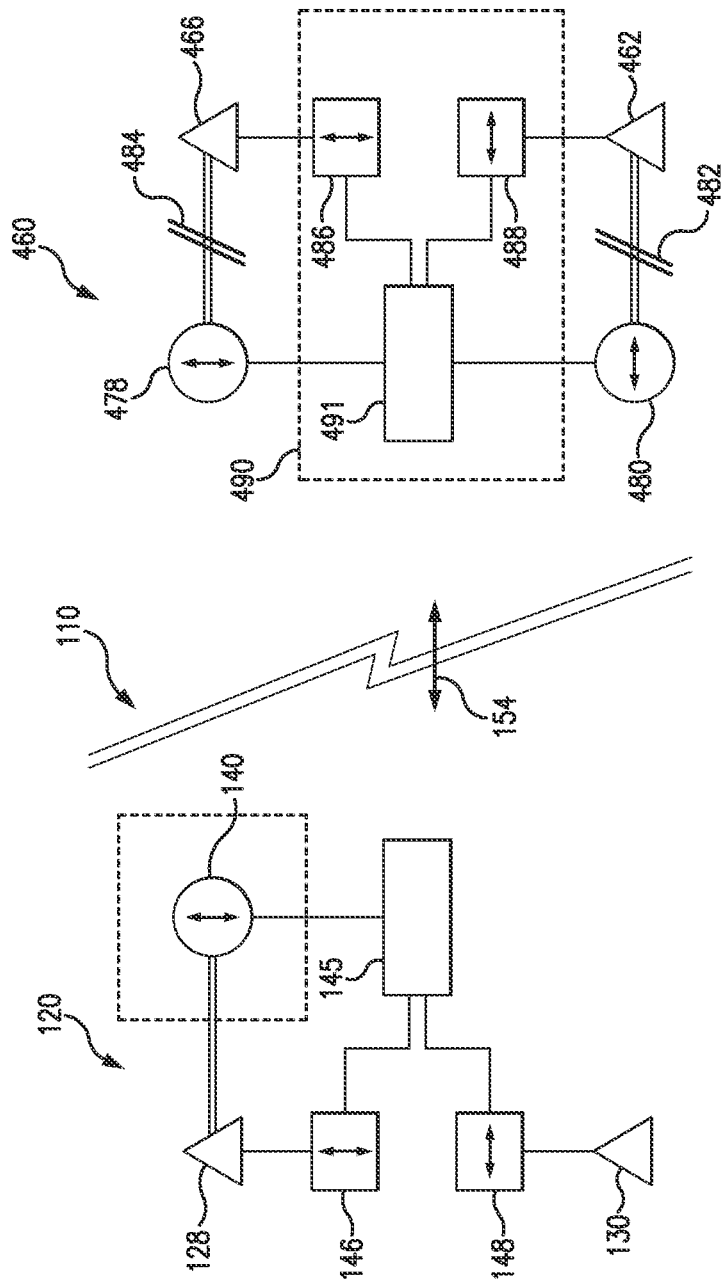
FIG. 9 is a representative block diagram of an alternative disclosed spotlight control system and associated spotlight assembly.

FIG. 9 is a representative block diagram of another disclosed spotlight control system 120 and associated spotlight assembly 460. The left-hand portion of FIG. 9 depicts another embodiment of spotlight control system 110 in which the control assembly 120 only has a handle motor 140. In the depicted embodiment, the outer shaft 128 is mechanically linked to a handle motor 140 and the inner shaft 130 is not connected to a motor. The position of the outer shaft 128 and handle 27 is detected by handle sensor 146. This configuration allows the control assembly 120 to move the outer shaft 128 and handle 27 to a "home" position, or to conform the position of the handle 27 to the current or stored position of the spotlight assembly 460. The position of the inner shaft 130 (and grip 29) is detected by the grip sensor 148. The position of the handle 27 and grip 29 are reported to the control assembly microcontroller 145. The control assembly microcontroller 145 communicates with the spotlight 60 via a wired or wireless connection 154. The position of the grip 29 is less significant than that of the handle 27, since the grip 29 rotates about axis 25, and the position of the grip 29 relative to the operator is determined by the position of the handle 27. The user interface can be returned to a "home" or other position by a single motor 140, because the rotational position of the grip 29 always appears the same to the operator.

It is also possible to have a passive control assembly with no motors. Handle motor 140 is shown surrounded by a dashed box in FIG. 9, indicating that this motor and its connection to the outer shaft 128 may be omitted. Without motors, the control assembly becomes "passive" in that it can move only when manipulated by an operator, but otherwise functions in the same manner as controllers 20, 120. The feel of the mechanical control interface can be simulated using friction, which also allows the control interface 21 to remain in a given position when released by an operator, even in the absence of a motor and drive gear(s).

Figure 10:
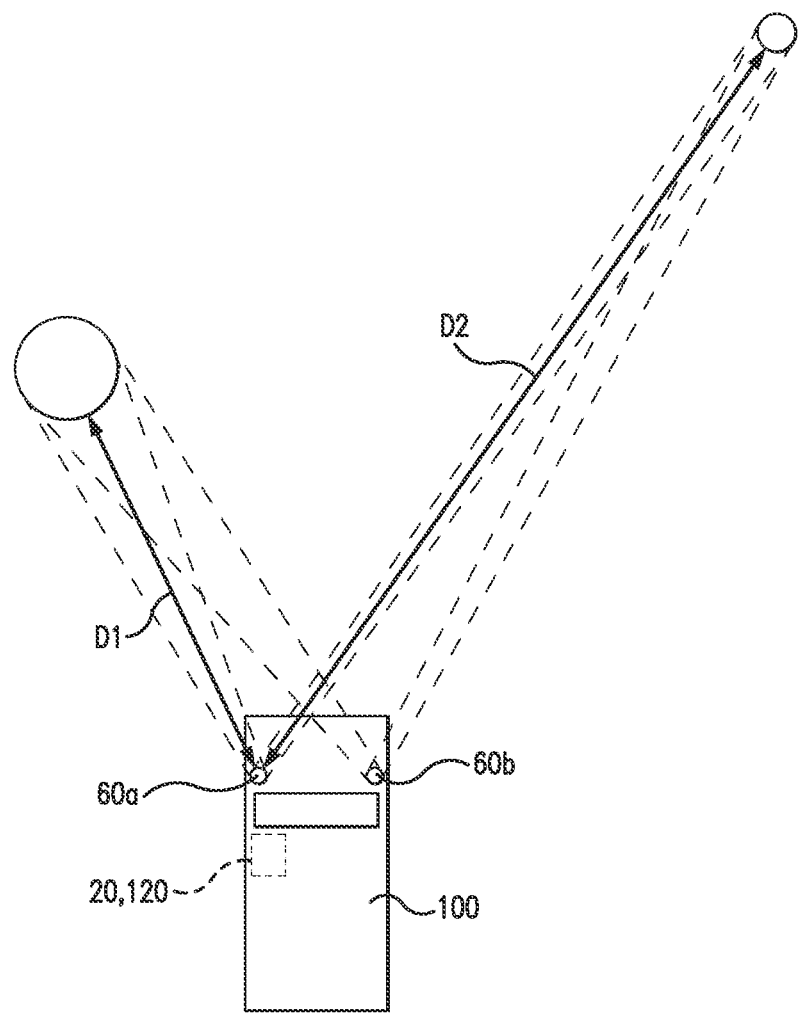
FIG. 10 depicts a vehicle that is equipped with two spotlight assemblies according to aspects of the disclosure.
Figure 11:
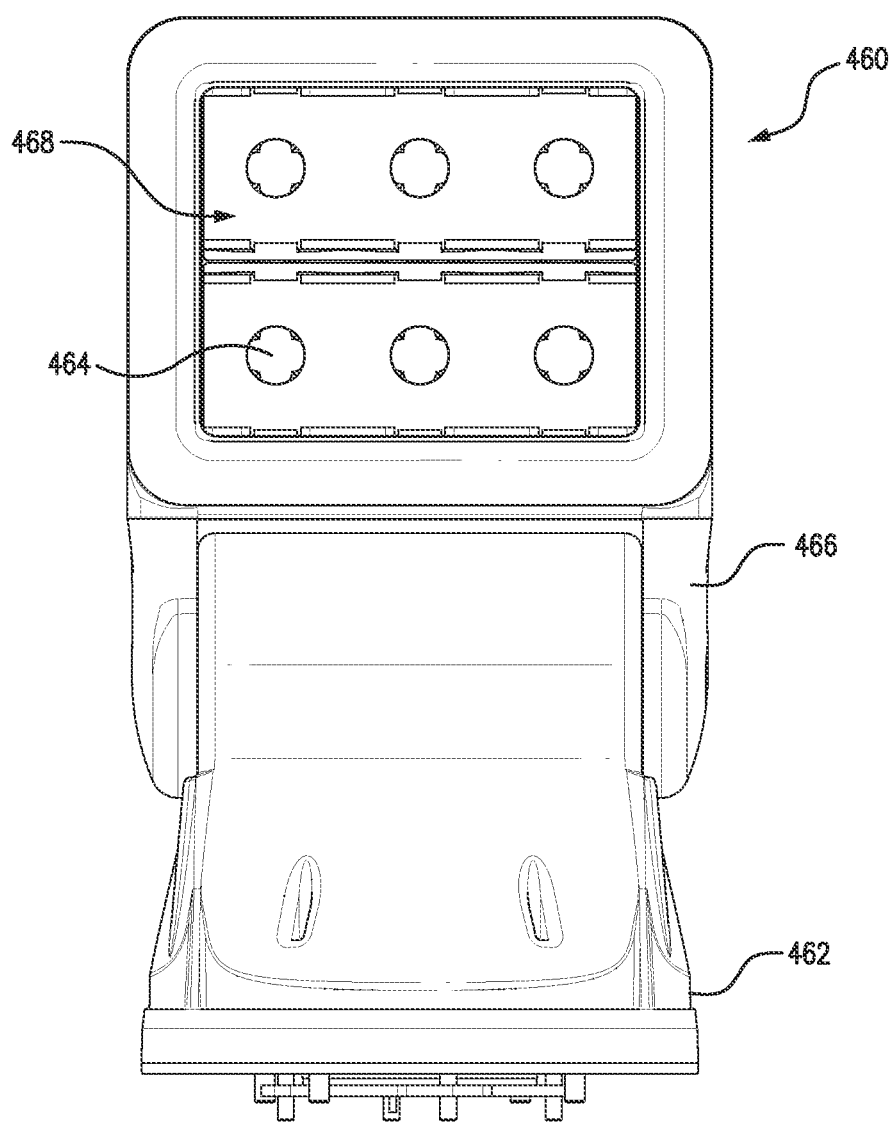
FIG. 11 is a front view of another embodiment of a spotlight assembly.
Figure 12:
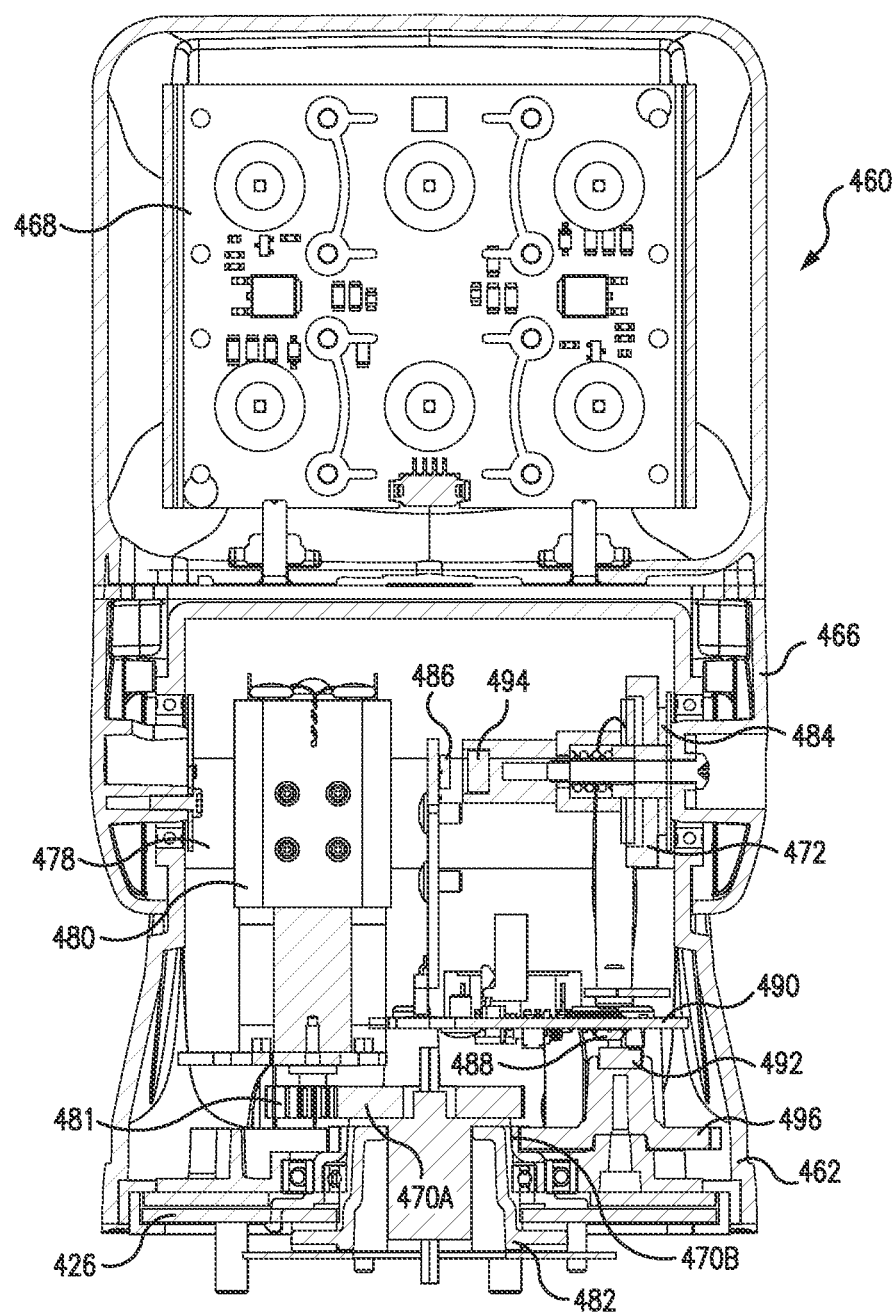
FIG. 12 is a rear sectional view of the spotlight assembly of FIG. 11.

FIG. 10 depicts an embodiment in which a vehicle 100 is equipped with two spotlight assemblies 60a, 60b being directed by spotlight control signals generated by the control assembly 20, 120. The second spotlight assembly 60b has a known position relative to the first spotlight assembly 60a and the transfer function used by the control assembly 20, 120 may modify the control signals to the second spotlight assembly 60b to account for the difference in position between the two spotlight assemblies so that the light beams generated by the two spotlight assemblies are directed at the same target (point in space). In some embodiments, at least one of the spotlight assemblies includes a detector (e.g., photoelectric detector and/or laser detector) to determine the distance (e.g., D1 or D2) or the target to facilitate directing the spotlight assemblies. Other configurations with more than two spotlight assemblies are contemplated.

FIGS. 11-14 depict another embodiment of a spotlight assembly 460 that is similar in configuration and function to spotlight assembly 60 and will be described in detail only with respect to areas where it differs from the previous embodiment. The spotlight assembly 460 includes a light source 468 mounted to a pivotable yoke 466, which is mounted to a rotatable support 462. The light source 468 comprises a group of light generators 464, e.g., LED lights on a board, that together generate a beam of light that can be aimed by rotating the support 462 and pivoting the yoke 466. Spotlight assembly 460 includes clutches 482, 484 for the support 462 and the yoke 466. Both clutches 482, 484 include clutch pads that are spring biased into frictional engagement with the support 462 and the yoke 466, respectively. When a force is applied to the support 462 or yoke 466 that enough to overcome the frictional engagement of the clutches 482, 484, the support 462 and yoke 466 are allowed to move while their respective driven gears 470, 472 remain meshed with motor drive gears 481, 479. The inclusion of the clutches 482, 484 provides a mechanism to prevent forces applied directly to the spotlight 460 from damaging the drive mechanisms. In this instance, the force generated by the user overcomes the friction of the clutches 482, 484 and the clutch parts slip relative to each other to prevent damage to the gears and/or motors.

Figure 13:
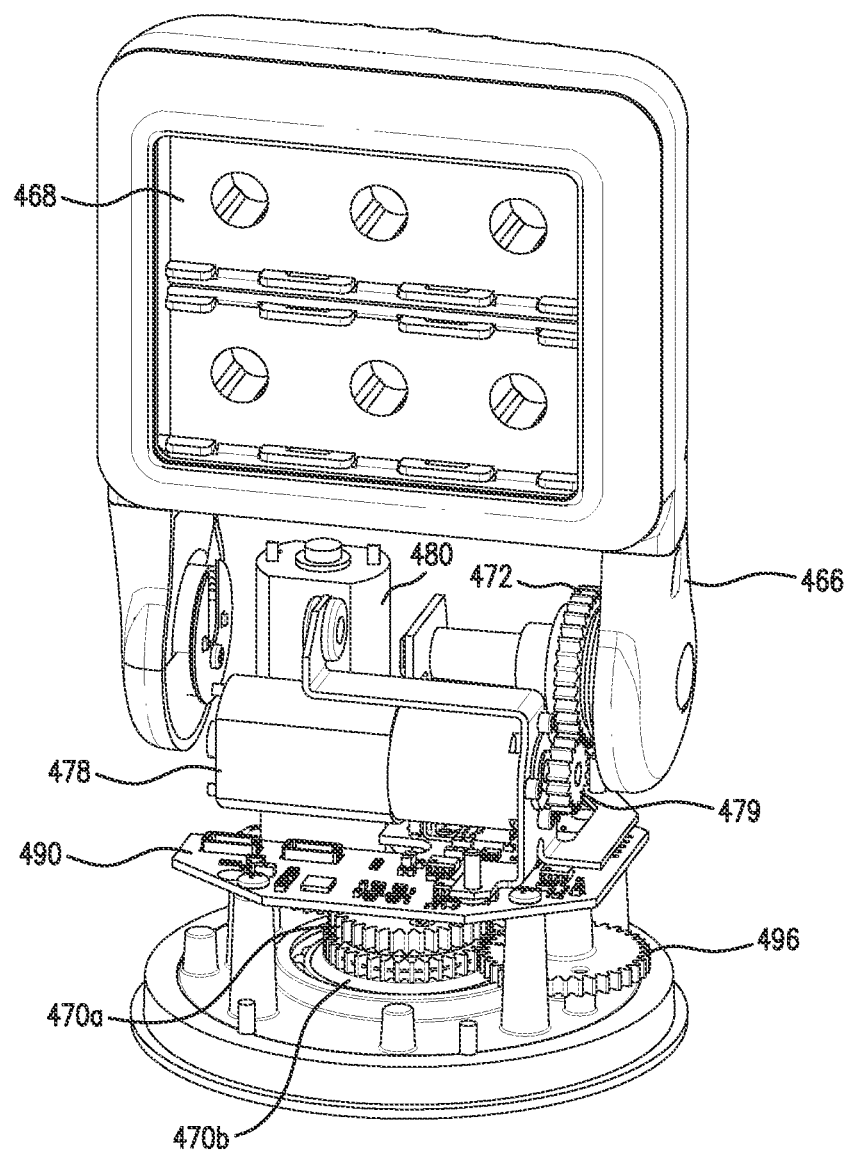
FIG. 13 is a front isometric view of the spotlight assembly of FIG. 11 with a portion of the housing removed for clarity.
Figure 14:
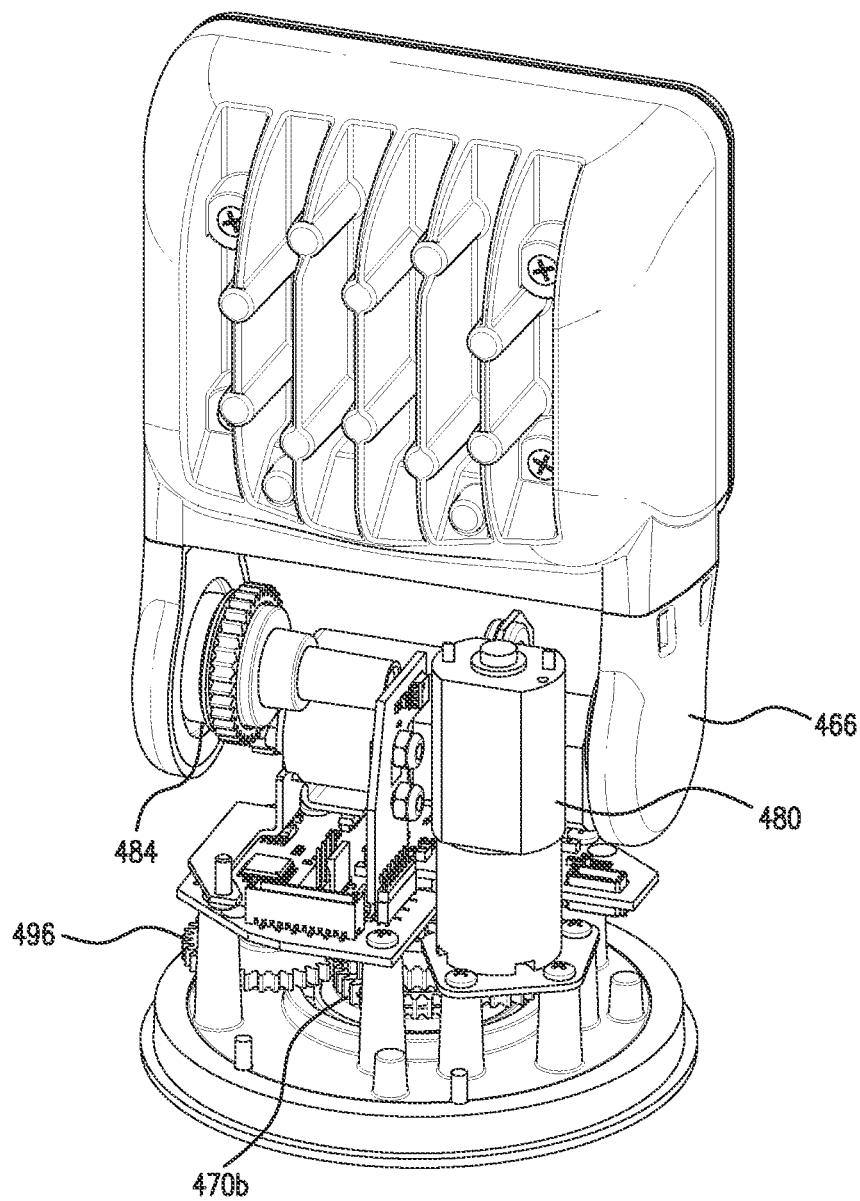
FIG. 14 is a rear isometric view of the spotlight assembly of FIG. 11 with a portion of the housing removed for clarity.

In the depicted embodiment, support driven gear 470 is split into axially spaced support driven gear 470a that is connected to the fixed base 426 of the spotlight by clutch 482 and magnet drive gear 470b that is directly mounted to the base 426 in a rotationally fixed position (see FIG. 13). Magnet drive gear 470b is meshed with magnet driven gear 496 that supports magnet 492. Magnet driven gear 496 will rotate the magnet 492 whenever there is relative movement between the support 462 and the base 426, even when support driven gear 470a can slip relative to the support 462. Yoke magnet 494 is directly coupled to the yoke 466 and rotates with the yoke 466 even when the yoke driven gear 472 can slip relative to the yoke 466. This arrangement protects the pan and tilt drive trains of the spotlight assembly 460, while maintaining the accuracy of the pan and tilt position reported to the spotlight controller.

The right half of FIG. 9 is a schematic representation of the spotlight assembly 460, showing basic relationships between functional units of the spotlight assembly 460. As shown in FIG. 9, the mechanical connection between the support 462 and the support motor 480 includes clutch 482, while the mechanical connection between the yoke 466 and the yoke motor 478 includes clutch 484. The spotlight PC board 490 includes the spotlight microcontroller 491 and the support sensor 488 as well as the yoke sensor 486. The relationship between the support 462 and support sensor 488 is maintained, even when the clutch 482 slips. The relationship between the yoke 466 and the yoke sensor 486 is maintained, even when the clutch 484 slips.

Figure 15:
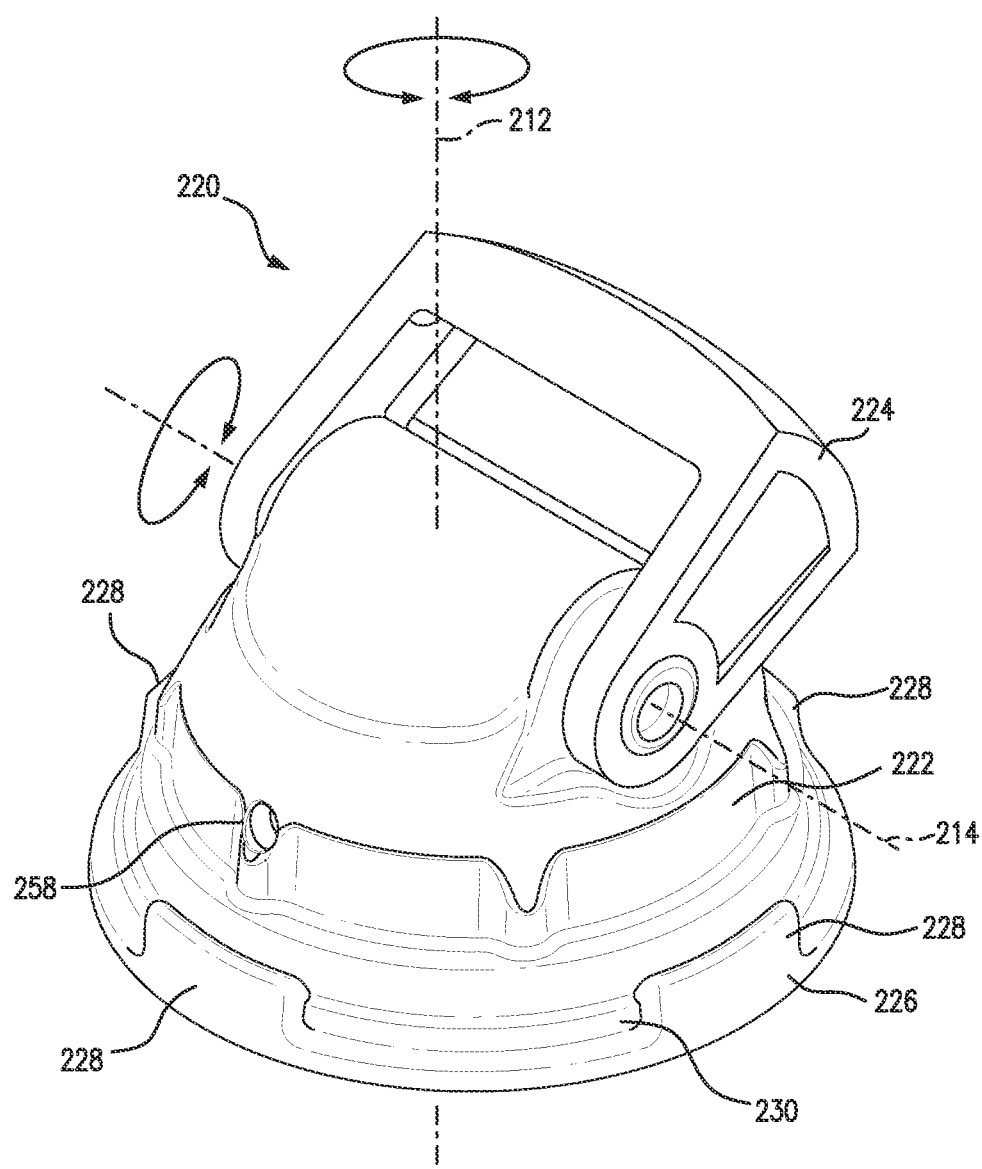
FIG. 15 is a perspective view of another embodiment of a spotlight control assembly according to aspects of the disclosure.

FIGS. 15-19 depict embodiments of a control assembly 220 according to aspects of the disclosure. Referring to FIG. 15, a housing 222 encloses the interior elements of the control assembly 220 and provides support for a handle 224. The design of the control assembly 220 provides a compact and intuitive control device for exterior spotlights. The design of the control assembly 220 minimizes the part count while also reducing the number of conductors attached to moving parts. Control assembly 220 is "passive" in that it does not include motors and moves only when manipulated by a user. It is possible to equip the control assembly 220 of FIGS. 15-19 with motors to achieve bi-directional control of the spotlight and control interface as described above with respect to control assembly 20 and spotlight 60.

Figure 16:
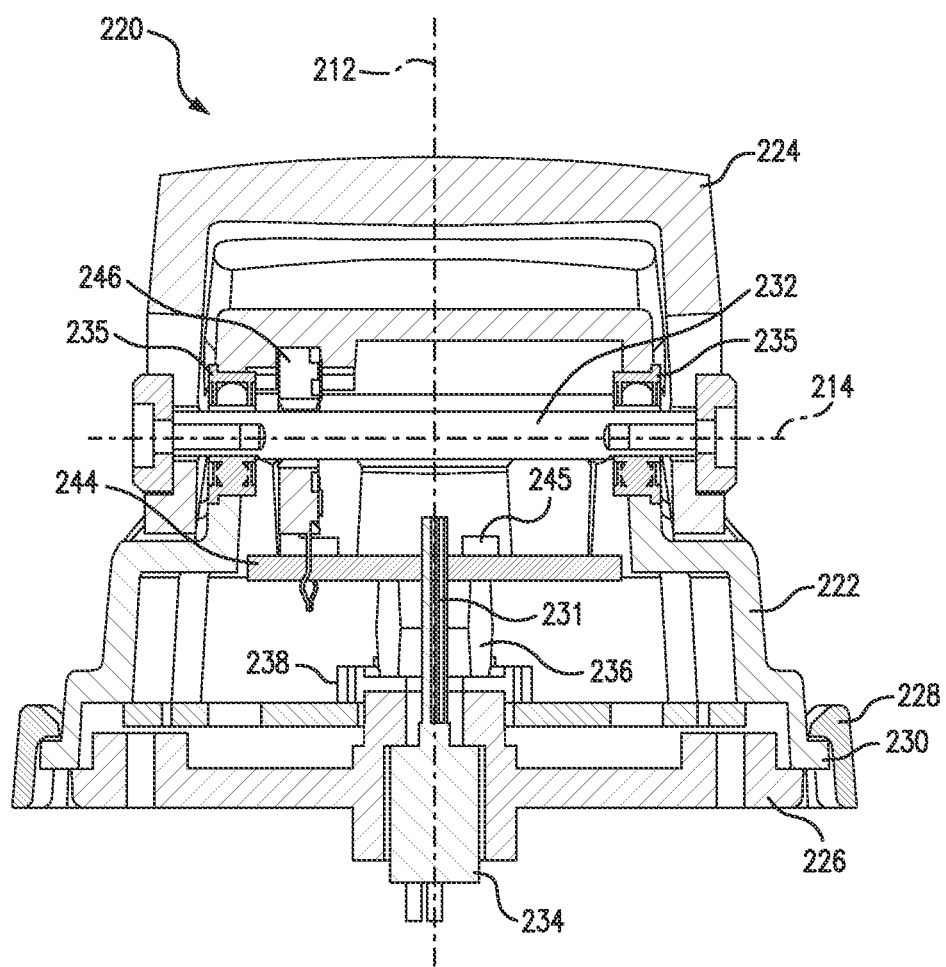
FIG. 16 is a front sectional view of the spotlight control assembly of FIG. 15.
Figure 17:
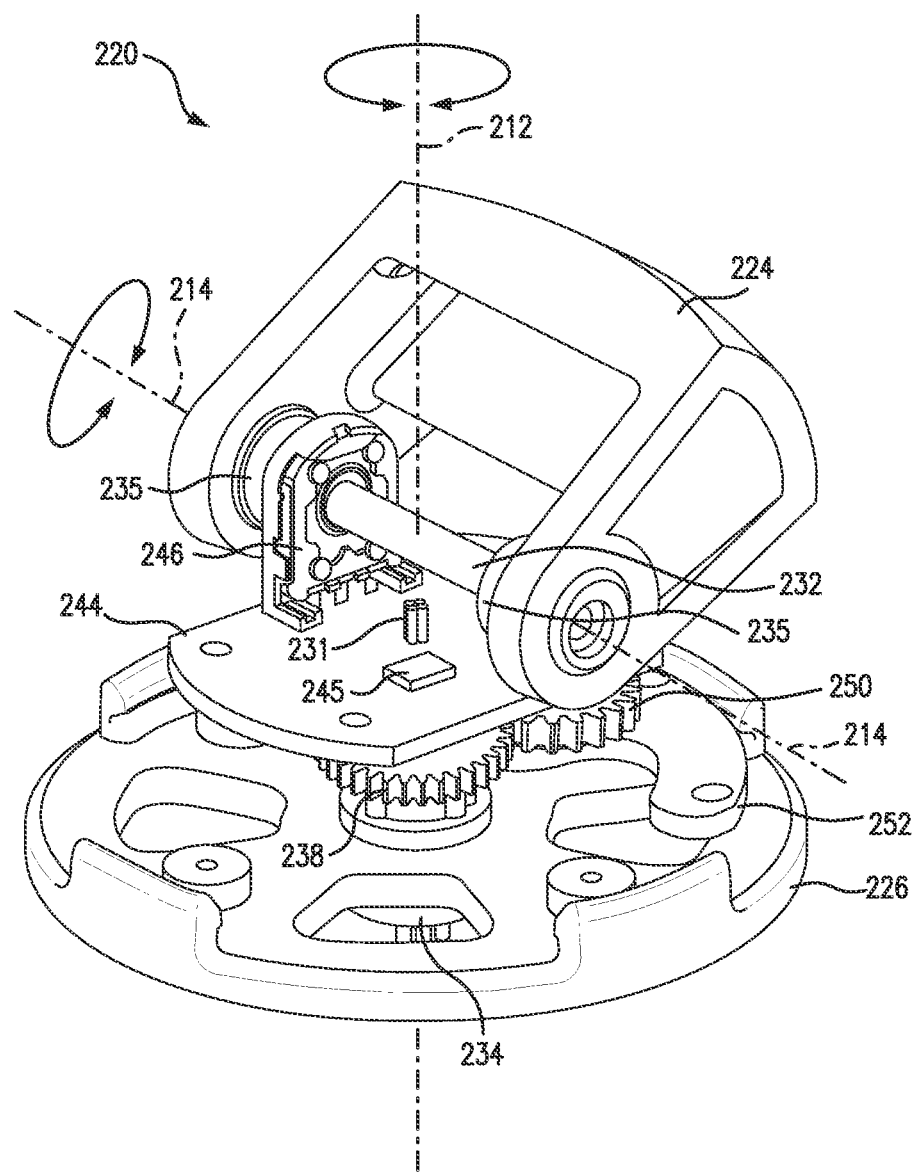
FIG. 17 is a front perspective view of the spotlight control assembly of FIG. 15 with the housing removed for clarity.
Figure 18:
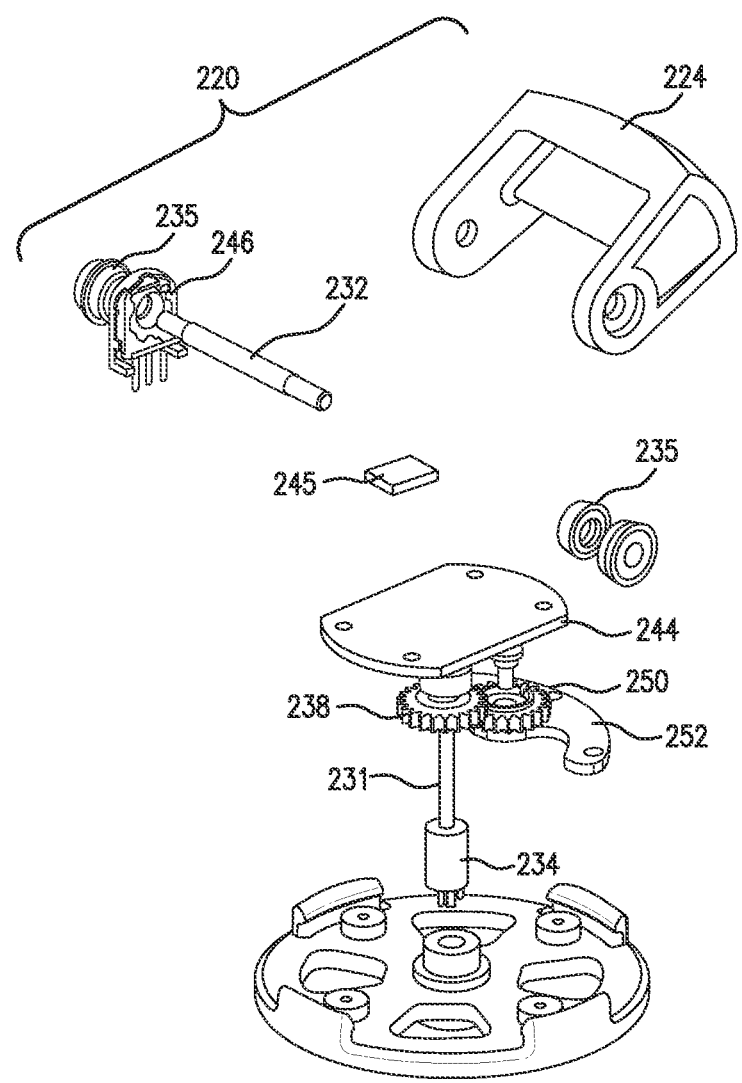
FIG. 18 is an exploded perspective view of the spotlight control assembly of FIG. 15.

Both the housing 222 and the handle 224 rotate about a controller first axis 212 relative to a base 226 that is mounted to a surface within the vehicle. The controller first axis 212 may correspond to the left-right (pan) direction of the spotlight. In the depicted embodiment, four tongues 228 project from the base 226 to engage a circumferential lip 230 of the housing 222. This tongue 228 and lip 230 connection allows continuous 360° rotation of the housing 222 and handle 224 about the controller first axis 212. As will be described in greater detail below, the structure of the other elements of control assembly 220 allow continuous 360° rotation of the housing 222 relative to the base 226, which eliminates the need to counter-rotate the housing 222 to reach a starting or "home" position. The housing 222 supports pivot points for the handle 224, which may include bearings 235 and a hub or shaft 232 as shown in FIGS. 16 and 17. The handle 224 pivots around a controller second axis 214, which may correspond to the up-down (tilt) direction of the spotlight. The control assembly 220 is intuitive in that rotation about the controller first axis 212 may correspond to rotational movement of a spotlight about a pan axis 74, and pivoting movement of the handle 224 about the controller second axis 214 may correspond to movement of the spotlight about a tilt axis 76. Forces from a user applied to the control assembly 220 result in housing movement about the controller first axis 212 and handle movement about the controller second axis 214 that correspond to desired spotlight movement about the spotlight pan and tilt axes 74, 76.

In the control assembly 220 of FIGS. 15-19, the housing 222 is supported by the peripheral lip 230 and a glide ring 236 surrounding the conductors 231 and controller first axis 212. The lip 230 engaged under tongues 228 allows rotational movement of the housing 222 relative to the base 226 about the controller first axis 212, while restricting other movement of the housing 222 relative to the base 226. The glide ring 236 provides additional support for the housing at the center of the control assembly 220. Conductors 231 secured to the control assembly PC board 244 pass through the hollow center of the glide ring 236 to the slip ring 234 and ultimately exit through a central aperture in the base 226.

The interior components of one embodiment of a control assembly 220 according to aspects of the disclosure are depicted in FIGS. 16-19. In this embodiment of a control assembly 220, the housing 222 supports a control assembly PC board 244, components to detect the rotational position of the housing 222 relative to the base 226 and components to determine the position of the handle 224 relative to the housing 222. The rotational position of the housing 222 relative to the base 226 may be used to generate a pan control signal to the spotlight, while the position of the handle 224 relative to the housing 222 may be used to generate a tilt control signal to the spotlight. A slip ring assembly 234 provides electrical continuity from conductors 231 connecting the control assembly 220 to power and other components of the system. The slip ring assembly 234 includes a part that is mounted in fixed relation to the base 226 and a rotating part that moves with the housing 222. The slip ring 234 provides electrical continuity between the fixed and rotating parts of the control assembly 220, while minimizing twisting or bending of the conductors 231 that move with the housing 222. The control assembly 220 configuration of FIGS. 15-19 eliminates any connection between a conductor and a moving component other than the conductors 231 passing through the slip ring 234.

Figure 19:
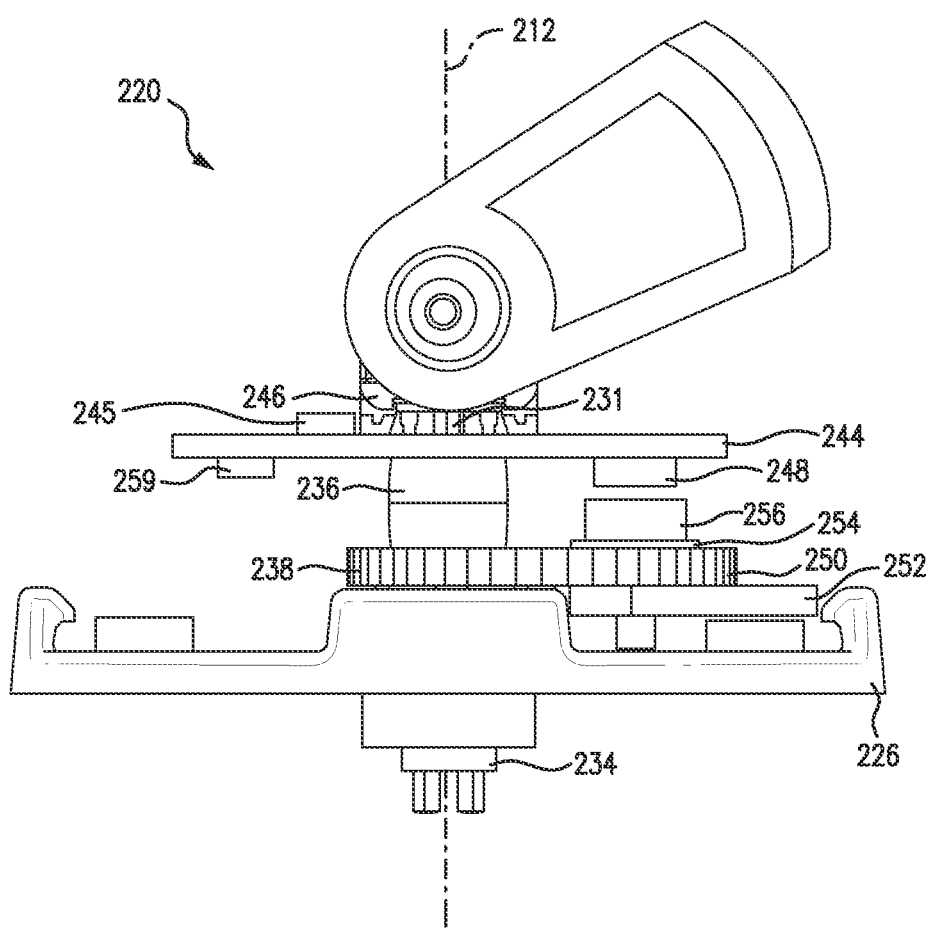
FIG. 19 is side view of the spotlight control assembly of FIG. 15 with some components omitted for clarity.

The handle 224 is configured for grasping with one hand of an operator and is used to apply rotational force to the housing 222, and pivoting force to change the position of the handle 224 relative to the housing 222. The handle 224 rotates about a hub or shaft 232 that is retained in handle bearings 235 supported in the housing 222. The shaft 232 and bearings 235 are centered on the controller second axis 214. In the control assembly 220 of FIGS. 15-19, only a single control assembly PC board 244 is necessary. The controller PC board 244 is mounted to the housing 222 generally parallel to the base 226 and has a handle sensor 246 arranged to detect the position of the handle 224 relative to the housing 222. In the embodiment depicted in FIGS. 15-19, the handle sensor 246 is a rheostat, the resistance of which varies with the position of the handle 224 relative to the housing 222. As shown in FIG. 19, the control assembly 220 includes a housing sensor 248 arranged to detect the position of the housing 222 relative to the base 226 as the housing 222 is rotated about the controller first axis 212. A microcontroller 245 on the control assembly PC board 244 is programmed to interpret the position data from the handle sensor 246 and housing sensor 248 and generate control signals used to direct movement of a spotlight 60. The microcontroller 245 sends these control signals out of the control assembly 220 through conductors 231 via the slip ring 234. The slip ring 234 ensures that the wiring 231 connected to the controller board 244 is not twisted or subjected to other off-axis forces during operation of the control assembly 220 and allows for continuous 360° rotation of the housing 222 relative to the base 226.

The relationship between movement of the housing 222 about the controller first axis 212 and movement of the handle 224 about the controller second axis 214 generated by user inputs and the direction of a spotlight 60 is determined by firmware running on the control assembly microcontroller 245 and/or the spotlight microcontroller. The relationship may be a one-to-one correspondence, meaning that the rotation of the housing 222 about the controller first axis 212 produces proportional left-right (pan) movement of the spotlight 60 and the rotation of the handle 224 about the controller second axis 214 produces proportional up-down (tilt) movement of the spotlight 60. The relationship may also be indirect, with rotational changes at the control assembly 220 resulting in larger or smaller movements of the spotlight 60 about its pan axis 74 and tilt axis 76. The relationship between user inputs at the control assembly 220 and spotlight movement may differ depending upon the configuration of the spotlight.

Referring to FIGS. 16-19, the control assembly PC board 244 is mounted to the housing 222 and moves with the housing 222. A first gear 238 is mounted in a fixed position to the base 226 and does not rotate relative to the base 226. A bracket 252 supports a second gear 250 arranged to mesh with the first gear 238 and rotate about a spindle 254 as the housing 222 is rotated about the controller first axis 212 relative to the base 226. A magnet 256 is mounted to rotate with the second gear 250, and the position of the magnet 256 is detected by the housing sensor 248, which provides input signals to the microcontroller 245. The housing sensor 248 is mounted to the controller PC board 244. The housing 222, controller PC board 244, bracket 252 and second gear 250 rotate together relative to the fixed base 226.

The housing 222 is symmetrical and is allowed to rotate continuously about the first axis 212, so it may be difficult for a user to determine the correct starting position for the controller housing 222, which determines the direction of movement of the handle 224 about the controller second axis 214. It will be apparent that movement of the handle 224 relative to the housing 222 will be reversed when the housing 222 is facing away from the user, as opposed to when the housing 222 is facing toward the user. As an aid in determining the orientation of the housing 222, a light pipe 258 is arranged on one side of the housing 222. The light pipe 258 is arranged to conduct light from one or more LEDs 259 on the control assembly PC board 244 to the exterior of the housing 222. The LEDs 259 may be two or more LEDs, each of which generates a single color, or may be a single LED capable of generating at least two different colors. When the control assembly 220 is receiving inputs from a user, the control assembly microcontroller 245 generates spotlight control signals that are received by a microcontroller 91 in the spotlight 60, which uses the pan and tilt control signals to drive spotlight pan motor 80 and tilt motor 78 to match the spotlight 60 direction to the position of the control assembly 220 according to a programmed transfer function. It is common for personnel to manually change the position of the spotlight 60 by grasping the spotlight and moving it when the personnel are outside the vehicle. In this case, the position of the spotlight 60 will no longer correspond to the position of the control assembly 220.

According to aspects of the disclosure, a light pipe 258 is mounted in an opening in the housing 222, as shown in FIG. 15. The light pipe 258 penetrates the housing 222 and transmits light generated by the one or more LEDs 259 (depicted in FIG. 19) on the control assembly PC board 244, making light from the LEDs 259 visible to a user. The light pipe 258 differentiates the front and back of the housing 222 and the color of light generated by the one or more LEDs 259 may indicate whether the position of the control assembly 220 and the spotlight 60 are properly aligned with one another. If the positions of the control assembly 220 and the spotlight match, they are in an aligned state and the light pipe 258 illuminates a first color, which may be blue. If the positions of the control assembly 220 and the spotlight do not match, the light pipe 258 illuminates a second color, which may be red. In the disclosed embodiment, the respective control assembly microcontroller 245 and the spotlight microcontroller 91 may be programmed to bring the spotlight 60 into alignment with the position corresponding to the position of the control assembly 220 when the user provides an input at the control assembly 220. Initiation of movement at the control assembly 220 may "wake up" the spotlight 60, and the system may be programmed to bring the spotlight 60 into alignment with the position of the control assembly 220, with the spotlight 60 and control assembly 220 moving in coordinated fashion.

Figure 20:
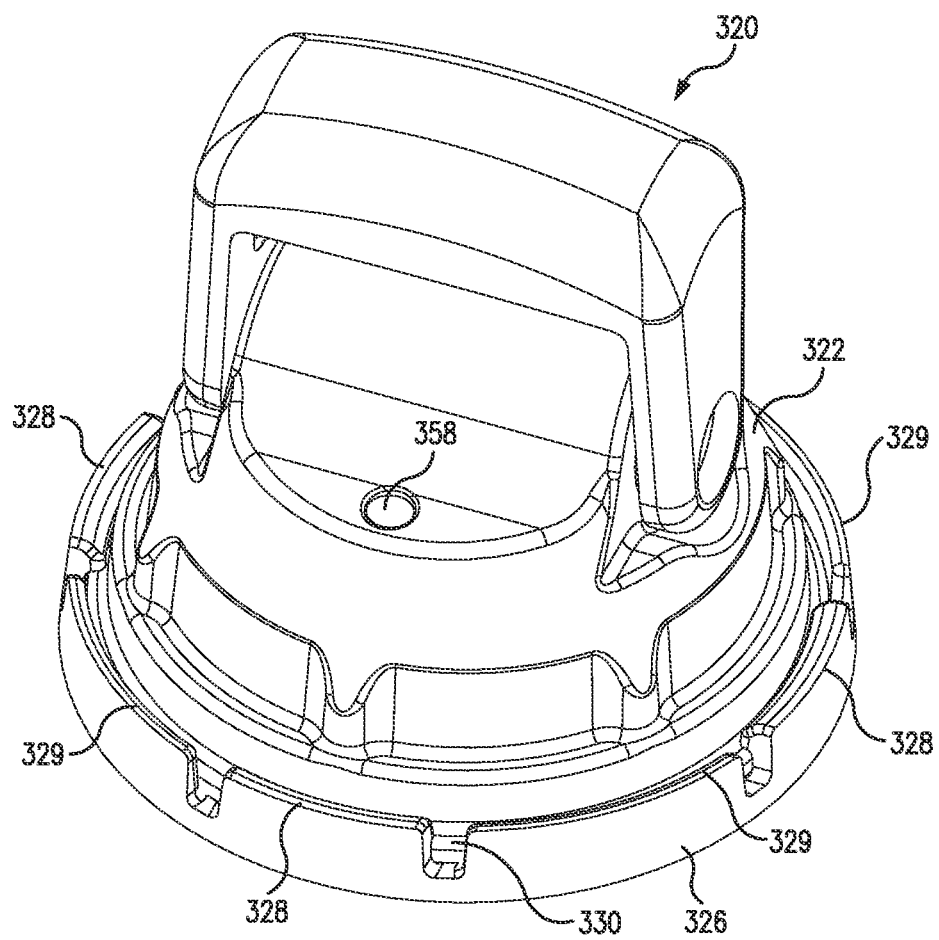
FIG. 20 is a perspective view of another embodiment of a spotlight control assembly according to aspects of the disclosure.
Figure 21:
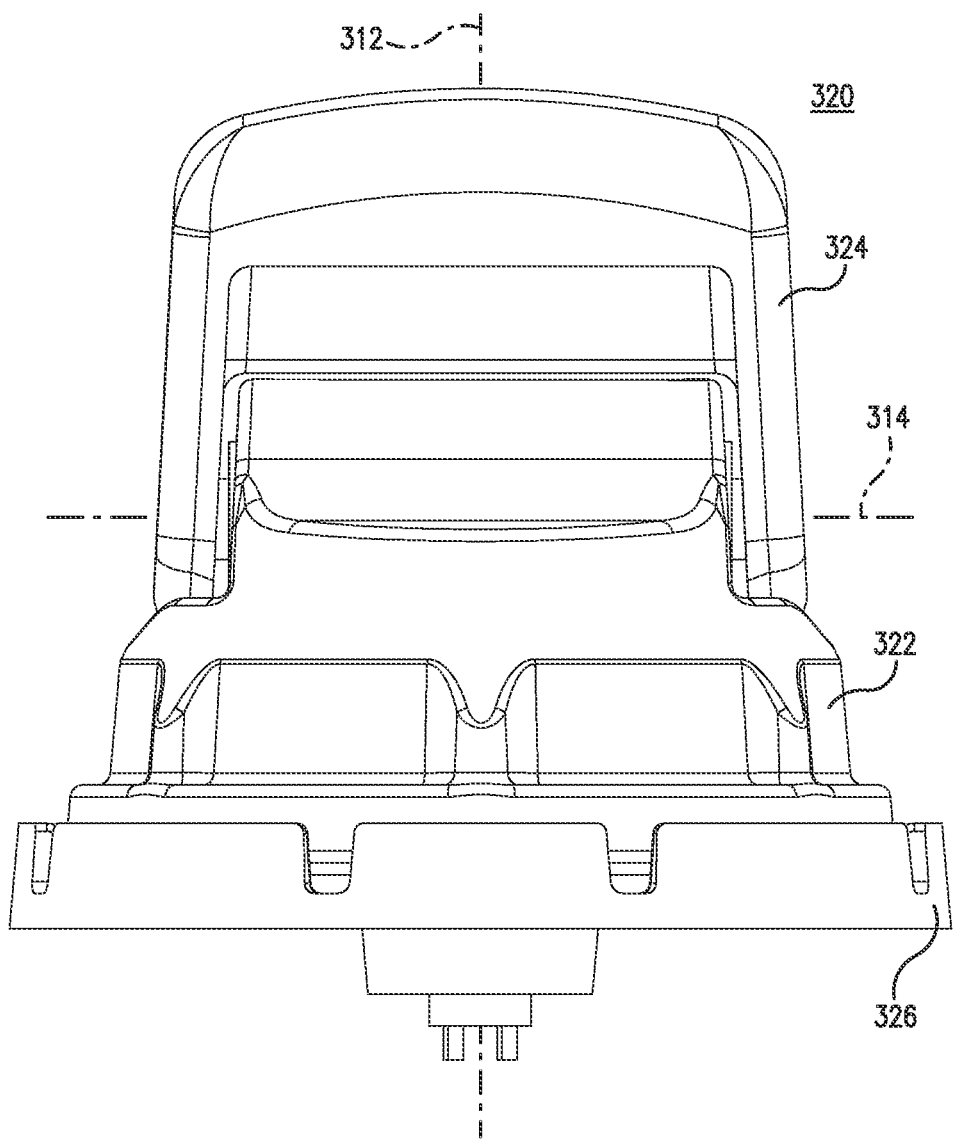
FIG. 21 is a rear view of the spotlight control assembly shown in FIG. 20.
Figure 22:
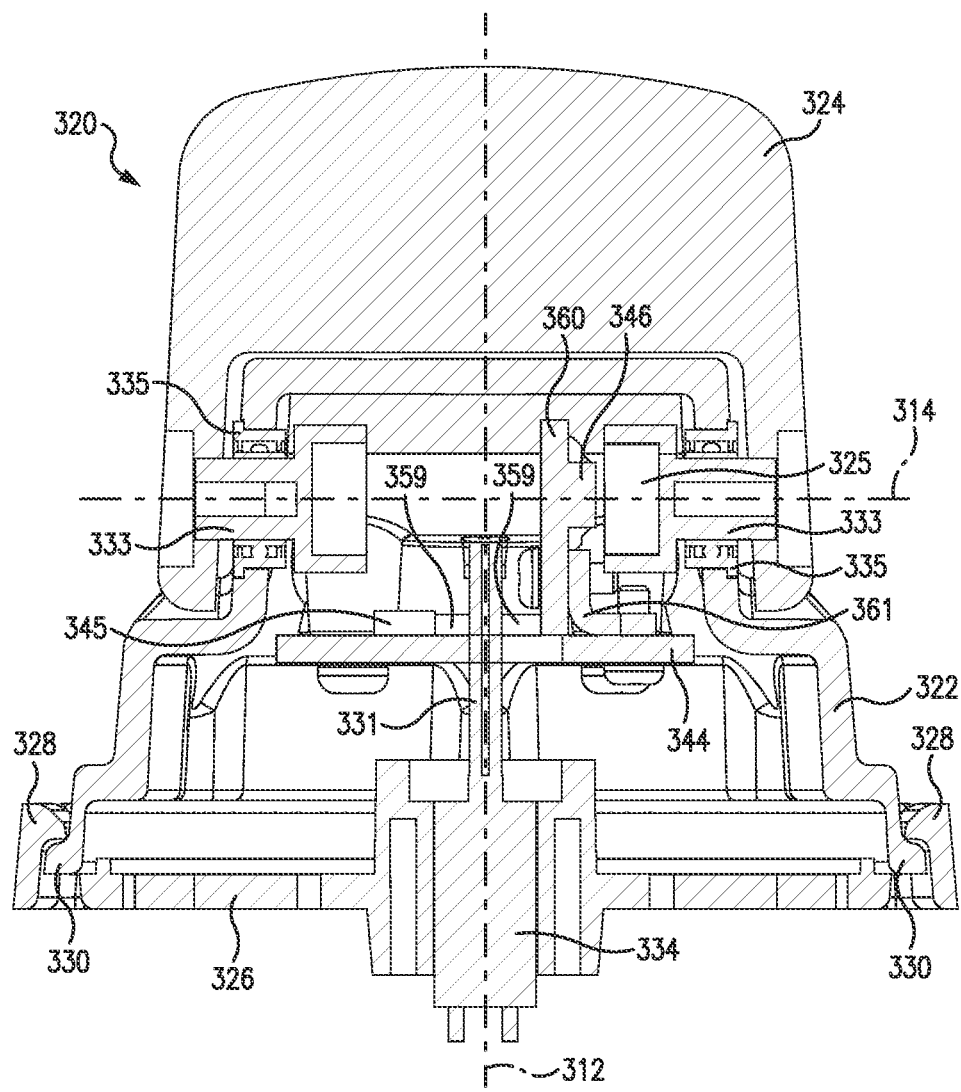
FIG. 22 is a sectional view of the spotlight control assembly shown in FIG. 20.
Figure 23:
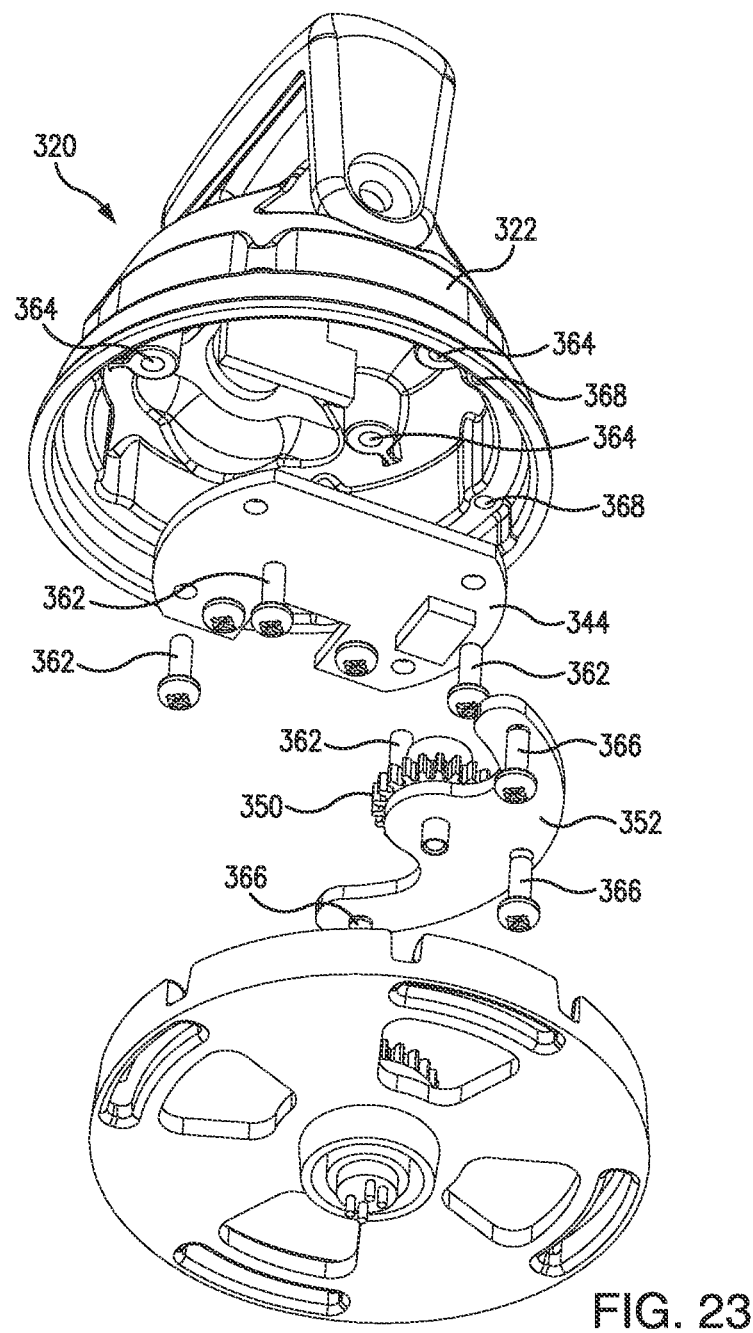
FIG. 23 is an exploded perspective view of the spotlight control assembly of FIG. 20, taken from below the control assembly.

FIGS. 20-23 depict a third embodiment of a control assembly 320. This embodiment of a control assembly 320 is similar in structure and function to the control assembly 220 of FIGS. 15-19 and will be described in detail only with respect to areas where the control assembly 320 differs from control assembly 220. Referring to FIG. 20, the housing 322 includes a lip 330 that engages four tongues 328 that project from the base 326. The tongues 328 alternate with arcuate wall segments 329 around the circumference of the base 326 to surround the lip 330 and control movement of the housing 322 relative to the base 326. The base 326 provides a connection with the housing 322 that permits rotation about axis 312 but prevents off axis movement of the housing 322 relative to the base 326. With reference to FIG. 23, the center of the housing 322 is not supported by a glide ring, such as 236 shown in FIG. 19. A light pipe 358 is mounted to a top surface of the housing 322. The light pipe 358 is positioned for ease of visibility and has an orientation to transmit light from LEDs 359 (depicted in FIG. 22) on the top surface of the control assembly PC board 344.

FIG. 22 depicts a cross-sectional view of the control assembly 320 at a plane including the controller first axis 312 and the controller second axis 314. The handle 324 engages a pair of hubs 333. The hubs 333 define the pivot point about which the handle 324 rotates and transmit movement of the handle 324 into the interior of the housing 322. The hubs 333 are supported by bearings 335 mounted in the housing 322. A magnet 325 is attached to one of the hubs 333, as shown in FIG. 22, and is rotated about the controller second axis 314 by the handle 324. A handle sensor 346 is supported on a sensor support board 360, which is perpendicular to the control assembly PC board 344. The sensor support board 360 supports the handle sensor 346 adjacent the magnet 325 attached to the handle 324 (described in detail below). The depicted sensor support board 360 is secured by a bracket 361 and may have flexible conductors electrically connecting the handle sensor 346 to the control assembly PC board 344. The handle sensor 346 measures the position of the handle relative to the housing 322 and generates position data for use by the control assembly microcontroller 345. Position data from the housing sensor 348 and the handle sensor 346 are used by the control assembly microcontroller 345 to generate control signals that are transmitted to the spotlight 60 through conductors 331 and a wired or wireless connection.

Figure 24:
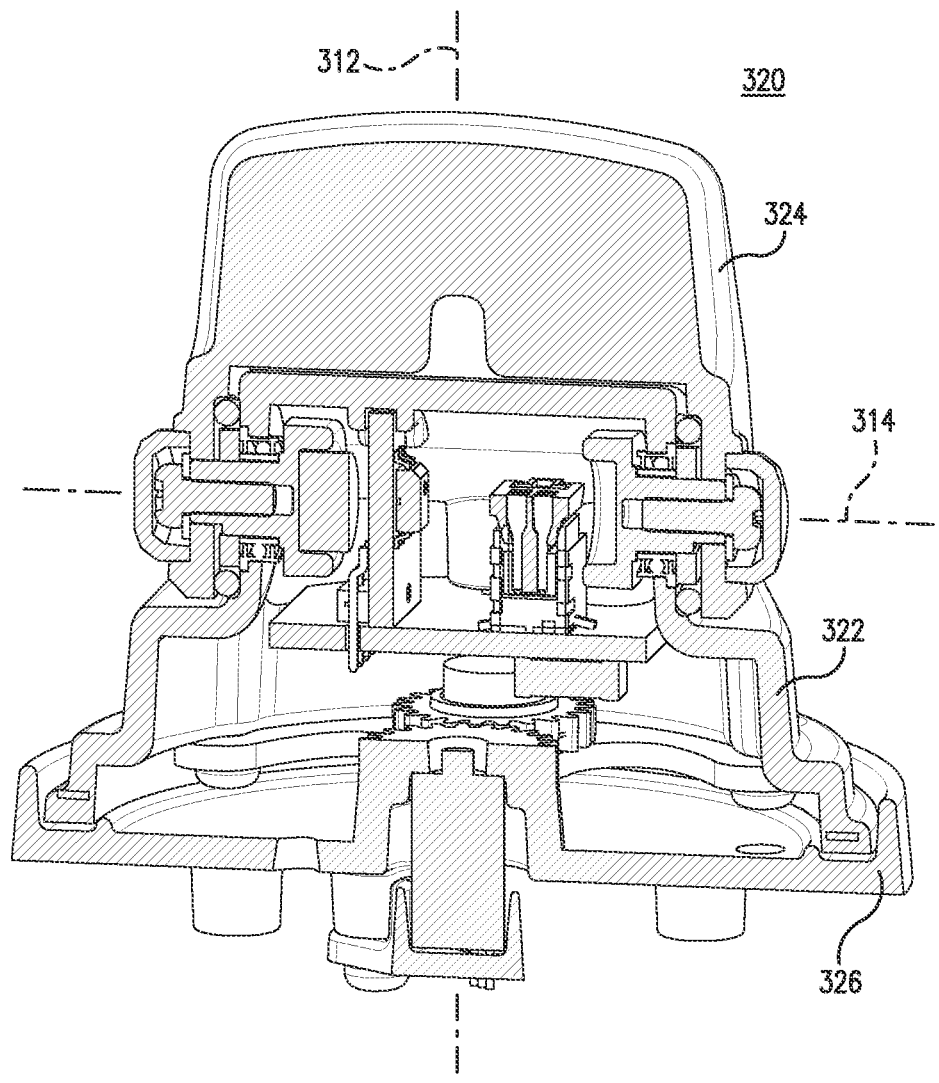
FIG. 24 is a sectional view of another embodiment of a spotlight control assembly according to aspects of the disclosure.

FIG. 23 provides additional detail regarding the internal structure of the control assembly 320 and the manner in which the control assembly PC board 344, gear support bracket 352 and second gear 350 are mounted to and supported by the housing 322. Fasteners 362 engage screw bosses 364 in the housing 322 to mount the control assembly PC board 344 to the housing 322. Bracket fasteners 366 engage screw bosses 368 to secure the gear support bracket 352 to the inside of the housing 322. The internal components of the control assembly 220 are mounted within the housing 222 in a similar manner. FIG. 24 depicts another cross-sectional view of a control assembly 320 at a plane including the controller first axis 312 and the controller second axis 314.

Figure 25:
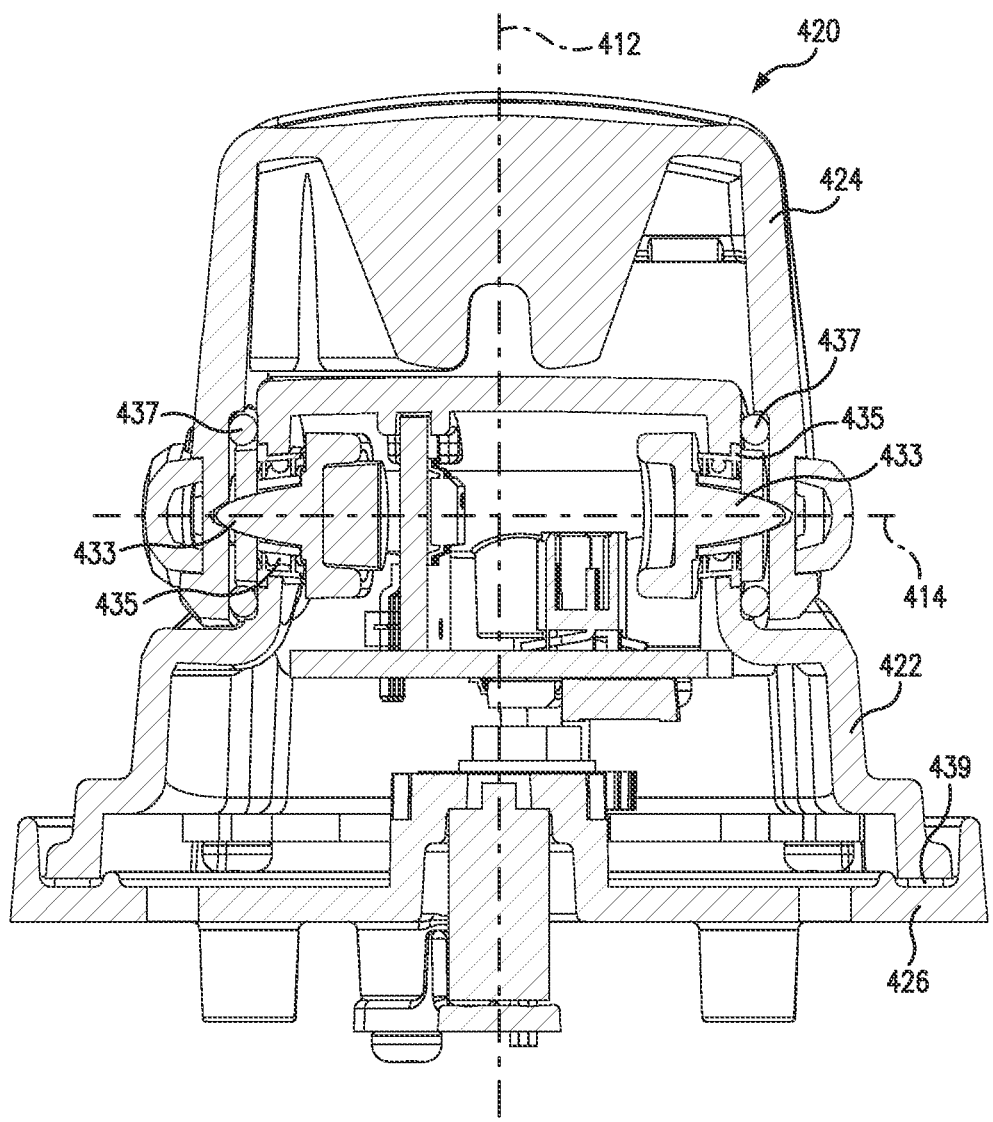
FIG. 25 is a sectional view of another embodiment of a spotlight control assembly according to aspects of the disclosure.

FIG. 25 depicts a fourth embodiment of a control assembly 420. This embodiment of a control assembly 420 is similar in structure and function to control assemblies 220, 320 and will be described in detail only with respect to areas where the control assembly 420 differs from the previous embodiments. Referring to FIG. 25, two O-rings 437 are trapped between the housing 422 and the handle 424, surrounding each hub 433 and bearing 435. The O-rings 437 provide friction during rotation of the handle 424 about the controller second axis 414. A wave spring 439 is included between the base 426 and the housing 422. The wave spring 439 provides friction during rotation of the housing 422 about the controller first axis 412. The friction caused by the O-rings 437 and wave spring 439 provides the user with a tactile feel when moving the control assembly 420 that mimics the feel of the prior art L-shaped handle mechanism discussed above. The friction is also sufficient to retain the handle 424 and base 426 in position when the user stops moving the control assembly 420.

Figure 26:
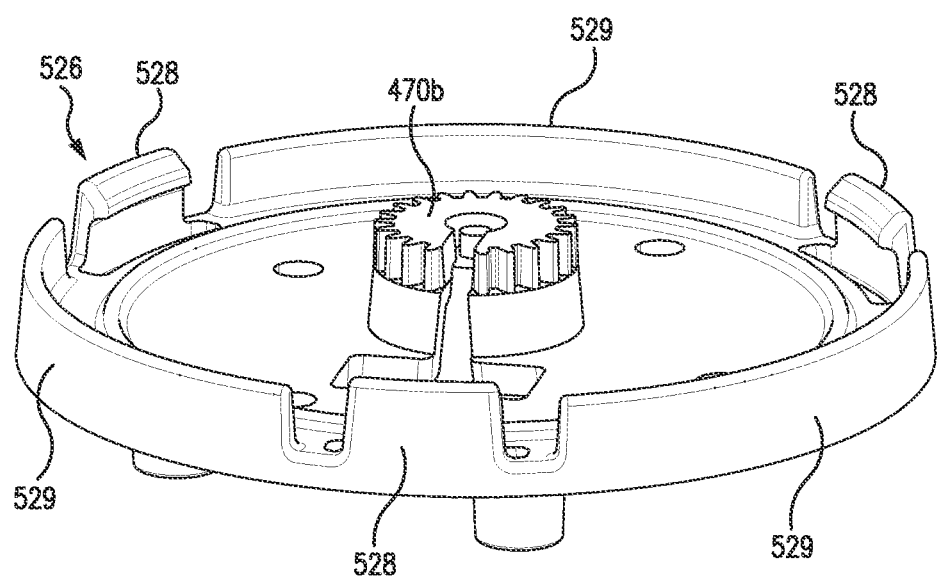
FIG. 26 is a perspective view of a base compatible with the disclosed control assemblies of FIGS. 15-25.
Figure 27:
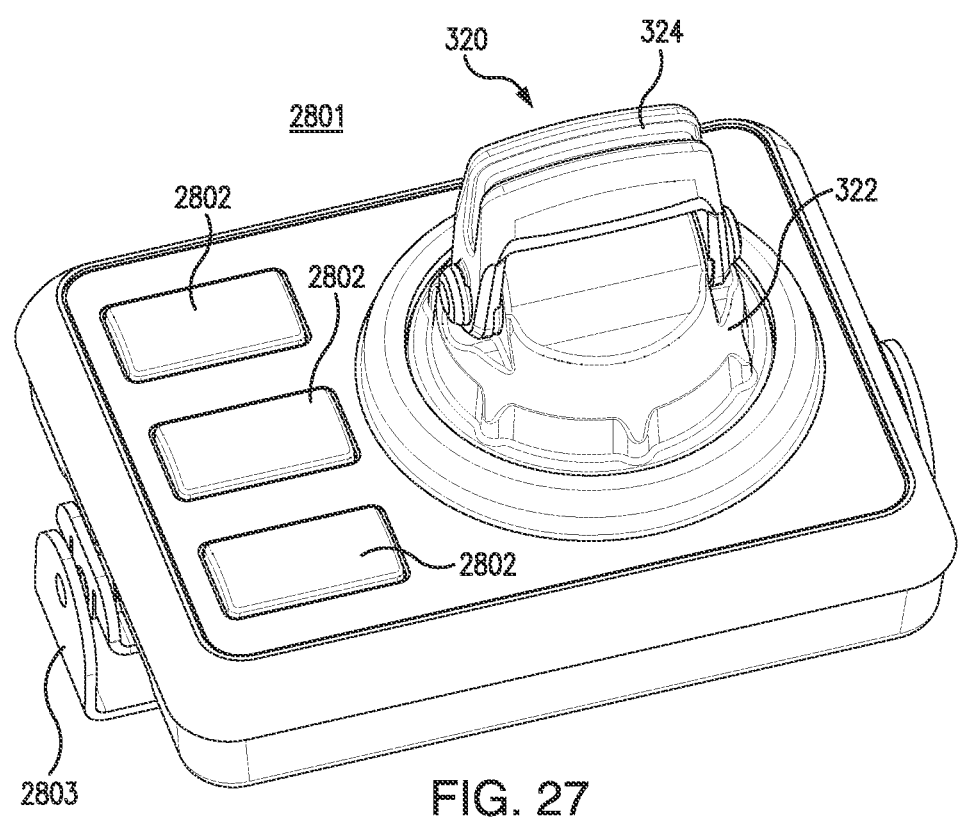
FIGS. 27-30 are illustrations of an embodiment of a control panel in various stages of disassembly.
Figure 28:
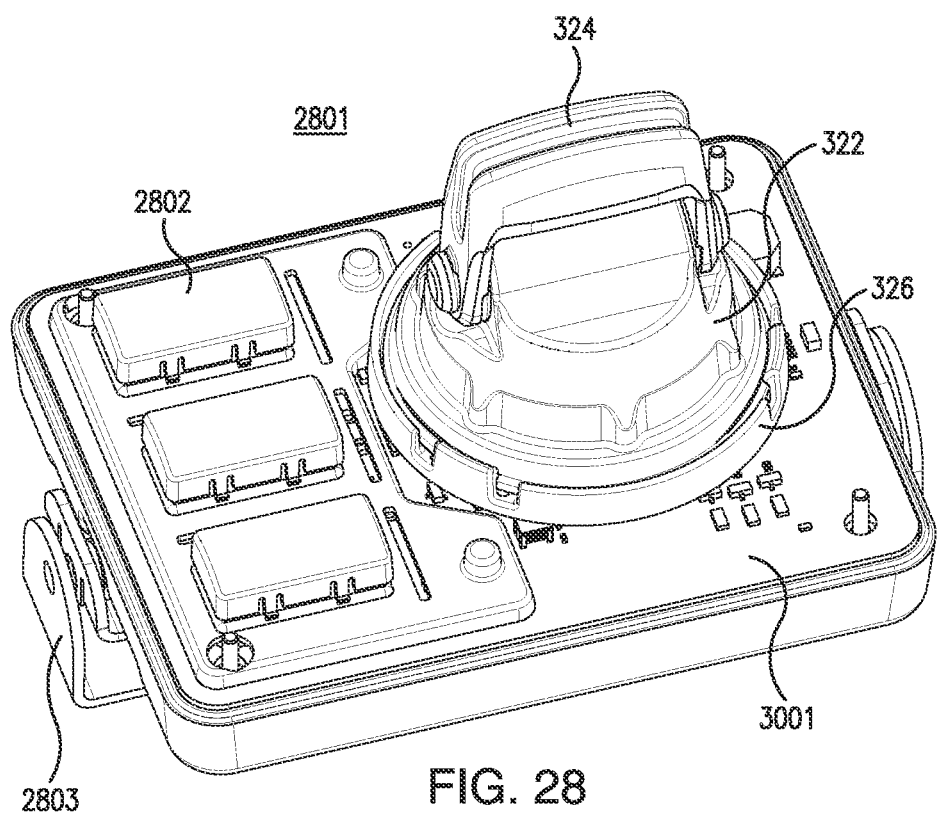
Figure 29:
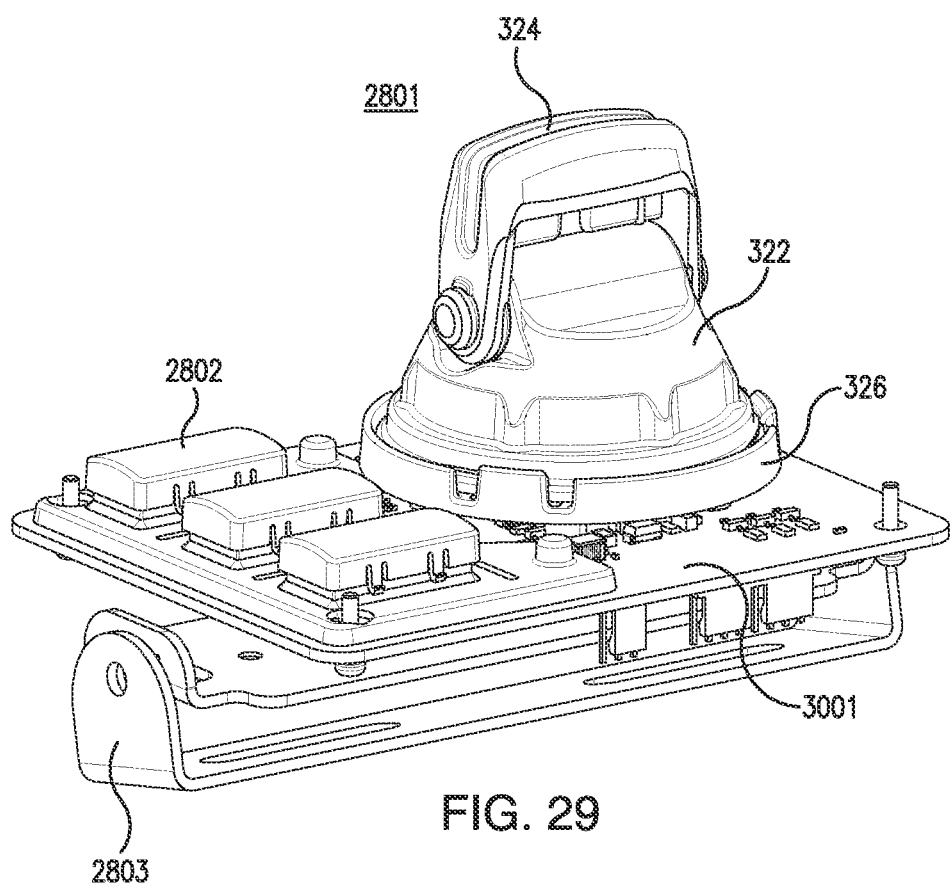
Figure 30:
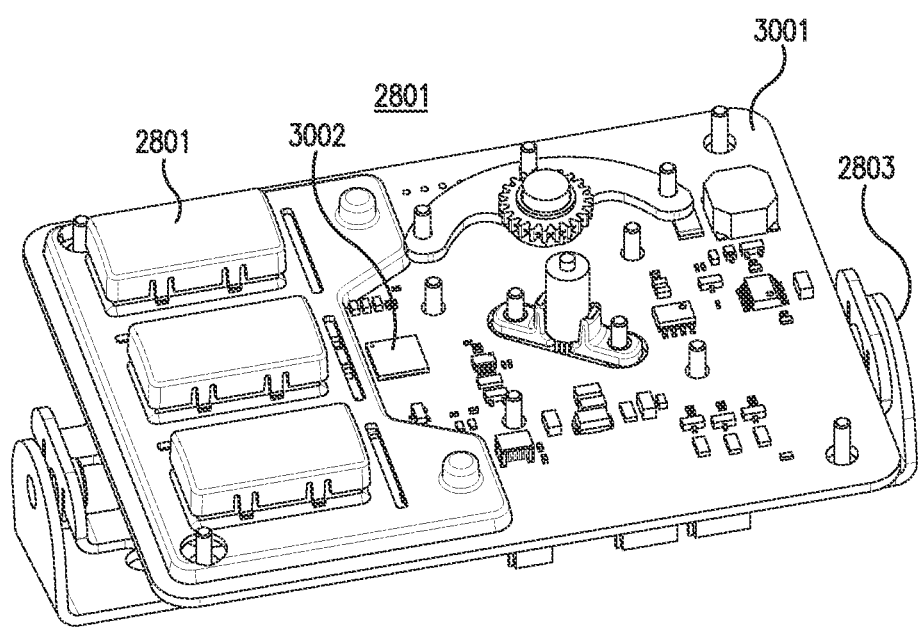

FIG. 26 illustrates an alternative base 526 for a disclosed control assembly 220, 320, 420, where the periphery of the base 526 incorporates three tongues 528 alternating with three arcuate wall segments 529. Magnet drive gear 470*b* is illustrated in fixed position relative to the base 526. The tongues 528 are 120° apart and separated by arcuate wall segments 529 arranged to guide rotational movement of the support relative to the base 526, which is mounted in fixed position relative to a vehicle (not shown).

FIGS. 27-30 illustrate a control panel incorporating a control assembly in various stages of disassembly. Control panel 2801 incorporates control assembly 320 therein. Control assembly 220 could also be incorporated in a similar manner. Control assembly 320 includes handle 324, housing 322, base 326, and an optional mounting assembly 2803.

Control assembly 320 is connected to circuit board 3001 included within control panel 2801. A control panel processor 3002 is connected to processor 345 of control assembly 320 to communicate control commands from control assembly 320 to control panel 2801. One or more switches 2802 can be included in control panel 2801.

Switches 2802 can be programmed to provide functions such as on/off, automatic scanning functions, not-in-use spotlight positioning, flood/spot adjustment, calibration commands, etc. For example, when not-in-use is activated, processor 3002 can send a signal to spotlight 60/460 processor 91/491 to pan away from front and tilt down. Also, processor 3002 can generate control signals for a preset scanning pattern and send those control signals to processor 91/491 to produce the scanning pattern at the spotlight 60/460. In another embodiment, processor 91/491 can generate the control signals for the preset scanning pattern to produce the scanning pattern at the spotlight 60/460 itself. Other programmable functions or features are contemplated.

Other components including visual and/or audible devices such as lights and speakers can be included in the control panel 2801 to provide visual and/or audible feedback to the user.

Figure 31:
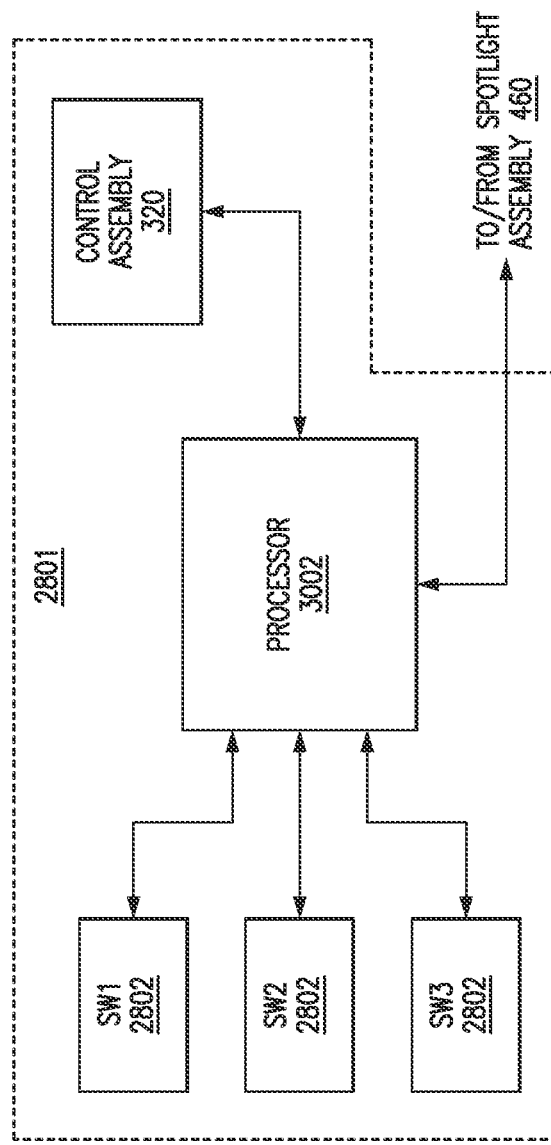
FIG. 31 is a block diagram illustrating an embodiment of a control panel.

FIG. 31 is a block diagram illustrating control panel 2801. As shown, control panel 2801 includes processor 3002 and control assembly 320 and can include the one or more switches 2802. Processor 345 communicates with processor 3002 to provide control signals for pan and tilt operations of spotlight 60/460. Processor 3002 sends the control signals to processor 91/491 in spotlight 60/460 to control positioning motors accordingly.

Figure 32:
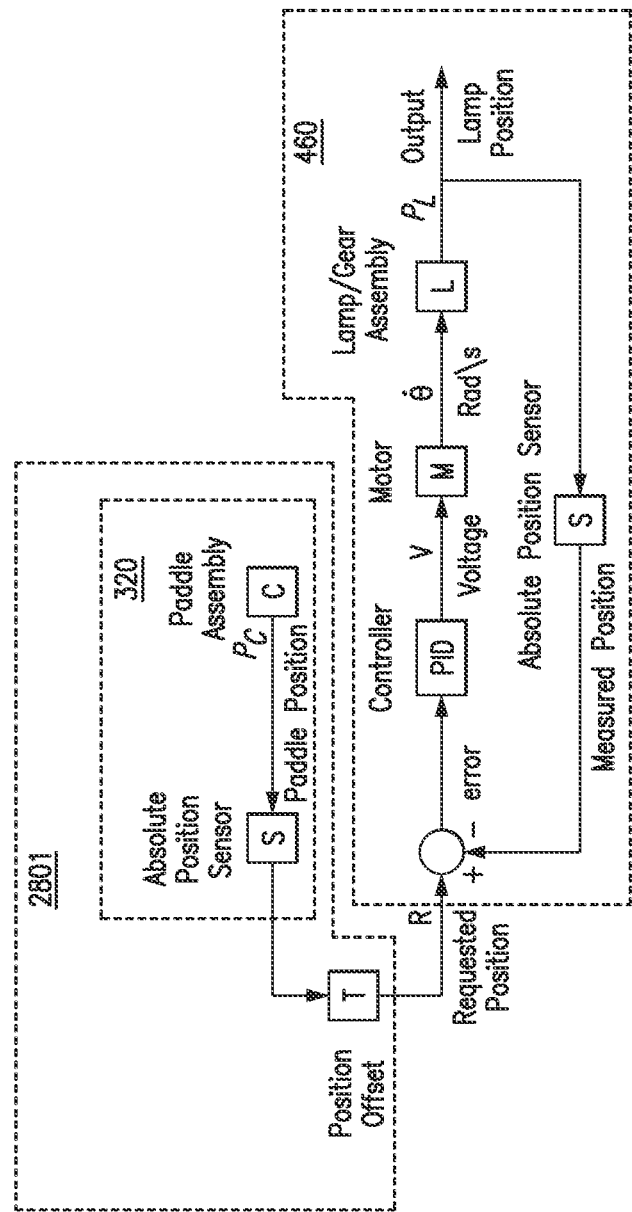
FIG. 32 is a control block diagram for the pan and tilt functions of the system according to the disclosed embodiment(s).

FIG. 32 is a control diagram illustrating the operation of the pan or tilt functions of the spotlight control system. FIG. 32 represents a control diagram for one axis, i.e. pan or tilt, and the circuit is duplicated to provide control for the other.

The operation of the spotlight control systems and methods and spotlights employing the same will now be described.

As handle (paddle) 324 is tilted and/or rotated, an absolute position sensor (described herein above as the magnetic sensor system) detects the handle 324 movement and outputs absolute position signals. This absolute position signal is sent from processor 345 to processor 3002. Processor 3002 performs a position offset calculation based on the absolute position signals to generate a requested position signal. The requested position signal is sent from processor 3002 to processor 91/491 in spotlight 60/460.

Processor 91/491 receives the requested position signal and outputs a voltage to operate the corresponding pan or tilt motor thus moving the spotlight 60/460 via the gear assembly. The absolute position sensor (described herein above as the magnetic sensor system) in the spotlight 60/460 outputs a measured position of the spotlight 60/460. This measured position signal is fed back and processed with the requested position to determine an error representing the difference between the requested position and the measured position. The error signal is processed by processor 91/491 to continue supplying a voltage to move the spotlight 60/460 until the error is zero. A margin of error of ±2.5 degrees is permitted to prevent unnecessary and constant movement of the spotlight during the error correction process; different margins of error can be programmed depending on the needs and accuracy of the system.

The disclosure also relates to methods of coordinating the position and movement of a control interface with the position and movement of a spotlight. Control assemblies are configured to sense the position of the components of a control interface and generate position signals corresponding to the position of components of the control interface. Control assemblies may be configured with one or more motors arranged to move the components of the control interface. A control assembly microcontroller may be programmed to generate a spotlight control signal based on the position of the components of the control interface. The control assembly microcontroller transmits the spotlight control signal to the spotlight via a wired or wireless connection. The control assembly microcontroller generates the spotlight control signal from the positions of the components of the control interface according to a programmable transfer function. The transfer function can be modified to alter the relationship between movements at the control interface and the resulting spotlight control signal.

Spotlight assemblies include a spotlight microcontroller programmed to receive the spotlight control signal and activate motors to direct a light generator of the spotlight according to the spotlight control signal. The relationship between the spotlight control signal and the direction of the spotlight is determined by the program executed by the spotlight microcontroller and can be varied by changes to the programming of the spotlight microcontroller. Spotlight assemblies are configured to sense the position of spotlight components that determine the direction of light emission from the light generator supported by the spotlight components. The spotlight assembly may be programmed to use the sensed position of spotlight components to generate a spotlight direction signal, which may be transmitted to the control assembly via a wired or wireless connection. Coordination between the control assembly and spotlight may include bi-directional control in which the control assembly microcontroller may be programmed to receive the spotlight direction signal and activate one or more motors in the control assembly to move at least one component of the user interface into a position corresponding to said spotlight direction signal. Bi-directional control includes the spotlight microcontroller responding to the spotlight control signal to direct the light generator according to user inputs at the control interface.

Examples of the processors referred to herein (whether referred to as microcontrollers, processors, or controllers), can be STMicroelectronics processor model STM32F072CBU6 for the control panel, STM32F042F6P6 for the control assembly, and STM32F303CBT6 for the spotlight. Other processors can be used.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A directionally manipulatable view enhancement apparatus, comprising:
    a fixed base selectively mountable to a surface;
    a rotatable support rotatably supported on a portion of the fixed base, the rotatable support being rotatable about a pan axis;
    a yoke pivotably disposed on a portion of the rotatable support, the yoke being pivotable with respect to the rotatable support about a tilt axis that is substantially perpendicular to the pan axis, wherein the yoke is configured to selectively retain an electrical component therein;
    a pan motor disposed on a portion of the rotatable support, wherein the pan motor selectively rotates the rotatable support, and thereby the yoke, about the pan axis;
    a tilt motor disposed on a portion of the rotatable support, wherein the tilt motor selectively rotates the yoke about the tilt axis; and
    at least one of a first clutch between the rotatable support and the pan motor, the first clutch permitting the rotatable support to rotate relative to the fixed base independently of the pan motor, or a second clutch between the yoke and the tilt motor, the second clutch allowing the yoke to rotate relative to the rotatable support independently of the tilt motor,
    wherein the pan motor and the tilt motor are in electrical communication with a controller disposed remote from the fixed base.

2. The apparatus according to claim 1, wherein the electrical component includes a target detector.

3. The apparatus according to claim 1, wherein the electrical component includes an electromagnetic radiation detector.

4. The apparatus according to claim 1, wherein the electrical component includes a light source and a detector.

5. The apparatus according to claim 1, wherein the fixed base is selectively mountable to an exterior surface of a vehicle.

6. The apparatus according to claim 1, wherein the rotatable support is continuously rotatable 360 degrees about the pan axis.

7. The apparatus according to claim 1, wherein the pan motor and the tilt motor are in wireless communication with a controller disposed remote from the fixed base.

8. A directionally manipulatable view enhancement system, comprising:
- a control assembly, including:
  - a base unit rotatable about a control pan axis; and
  - a control handle connected to the base unit and rotatable about a control tilt axis substantially perpendicular to the control pan axis;
- a fixed base selectively mountable to a surface, the fixed base disposed remote from the control assembly;
- a rotatable support rotatably supported on a portion of the fixed base, the rotatable support being rotatable about a pan axis;
- a yoke pivotably disposed on a portion of the rotatable support, the yoke being pivotable with respect to the rotatable support about a tilt axis that is substantially perpendicular to the pan axis, wherein the yoke is configured to selectively retain an electrical component therein;
- a pan motor disposed on a portion of the rotatable support and in electrical communication with the control assembly, wherein the pan motor selectively rotates the rotatable support, and thereby the yoke, about the pan axis;
- a tilt motor disposed on a portion of the rotatable support and in electrical communication with the control assembly, wherein the tilt motor selectively rotates the yoke about the tilt axis; and
- at least one of a first clutch between the rotatable support and the pan motor, the first clutch permitting the rotatable support to rotate relative to the fixed base independently of the pan motor, or a second clutch between the yoke and the tilt motor, the second clutch allowing the yoke to rotate relative to the rotatable support independently of the tilt motor.

9. The system according to claim 8, wherein the electrical component includes a target detector.

10. The system according to claim 8, wherein the electrical component includes an electromagnetic radiation detector.

11. The system according to claim 8, wherein the electrical component includes a light source and a detector.

12. The system according to claim 8, wherein manipulation of the base unit about the control pan axis effectuates a corresponding rotation of the pan motor, thereby effectuating rotation of the rotatable support about the pan axis.

13. The system according to claim 8, wherein manipulation of the control handle relative to the control tilt axis effectuates a corresponding rotation of the tilt motor, thereby effectuating rotation of the yoke about the tilt axis.

14. The system according to claim 8, wherein the control assembly further includes a base unit position sensor to generate a control pan axis position signal based on rotation of the base unit.

15. The system according to claim 14, wherein the control assembly further includes a control handle position sensor to generate a control tilt axis position signal based on rotation of the control handle.

16. The system according to claim 15, further comprising a processor for receiving the control pan axis position signal and the control tilt axis position signal.

17. A directionally manipulatable view enhancement system, comprising:
- a control assembly, including:
  - a base unit rotatable about a control pan axis;
  - a control handle connected to the base unit and rotatable about a control tilt axis substantially perpendicular to the control pan axis;
  - a base unit position sensor to generate a control pan axis position signal based on rotation of the base unit; and
  - a control handle position sensor to generate a control tilt axis position signal based on rotation of the control handle;
- a fixed base remote from the control assembly;
- a rotatable support rotatably supported on the fixed base, the rotatable support being rotatable about a pan axis;
- a yoke pivotably disposed on a portion of the rotatable support, the yoke being pivotable with respect to the rotatable support about a tilt axis that is substantially perpendicular to the pan axis, wherein the yoke is configured to selectively retain an electrical component therein;
- a support sensor arranged to detect a position of said support and generate a support position signal;
- a yoke sensor arranged to detect a position of said yoke and generate a yoke position signal;
- a processor receiving and processing the control pan axis position signal, the control tilt axis position signal, the support position signal, and the yoke position signal;
- a pan motor in electrical communication with the processor, wherein the pan motor receives from the processor a voltage signal based on at least one of the control pan axis position signal and the support position sensor and rotates the rotatable support, and thereby the yoke, about the pan axis; and
- a tilt motor in electrical communication with the processor, wherein the tilt motor receives from the processor a voltage signal based on at least one of the control tilt axis position signal and the yoke position sensor and rotates the yoke about the tilt axis.

18. The system according to claim 17, wherein the electrical component includes a target detector.

19. The system according to claim 17, wherein the electrical component includes an electromagnetic radiation detector.

20. The system according to claim 17, wherein the electrical component includes a light source and a detector.

21. The system according to claim 17, wherein the fixed base is selectively mountable to an exterior surface of a vehicle.

22. The system according to claim 17, wherein the rotatable support is continuously rotatable 360 degrees about the pan axis.

23. The system according to claim 17, wherein the pan motor and the tilt motor are in wireless communication with the control assembly.

* * * * *